United States Patent
Gupta et al.

(10) Patent No.: US 11,449,594 B2
(45) Date of Patent: Sep. 20, 2022

(54) METHOD AND SYSTEM FOR AUTHENTICATING USERS

(71) Applicant: MASTERCARD INTERNATIONAL INCORPORATED, Purchase, NY (US)

(72) Inventors: Ayushi Gupta, Kanpur (IN); Nibedan Kumar Bhawsinka, Cuttack (IN); Nishtha Gupta, Gurgaon (IN); Sahithi Billa, Gurgaon (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 38 days.

(21) Appl. No.: 16/677,075

(22) Filed: Nov. 7, 2019

(65) Prior Publication Data

US 2020/0151317 A1 May 14, 2020

(30) Foreign Application Priority Data

Nov. 8, 2018 (SG) .............................. 10201809937P

(51) Int. Cl.
*G06F 21/36* (2013.01)
*G06F 3/04847* (2022.01)

(52) U.S. Cl.
CPC .......... *G06F 21/36* (2013.01); *G06F 3/04847* (2013.01)

(58) Field of Classification Search
CPC ......... G06F 21/30–46; G06F 21/31–43; G06F 21/316; G06F 21/36; G06F 3/048; G06F 3/04847; G06F 3/011–015; G06F 3/013; H04W 12/68; H04L 9/0866
See application file for complete search history.

(56) References Cited

U.S. PATENT DOCUMENTS

| | | | |
|---|---|---|---|
| 9,561,431 B1* | 2/2017 | Pulido | A63F 9/0612 |
| 10,863,248 B2* | 12/2020 | Loretan | H04N 21/482 |
| 2003/0126471 A1* | 7/2003 | Hillis | G06F 21/316 726/21 |
| 2005/0187023 A1* | 8/2005 | Miyamoto | A63F 13/5375 463/43 |
| 2014/0125574 A1* | 5/2014 | Scavezze | H04W 12/06 345/156 |

(Continued)

OTHER PUBLICATIONS

Hashia, Shivani, Chris Pollett, and Mark Stamp. "On using mouse movements as a biometric." Proceeding in the International Conference on Computer Science and its Applications. vol. 1. Singapore: The International Conference on Computer Science and its Applications (ICCSA), 2005. (Year: 2005).*

*Primary Examiner* — Liang Y Li
(74) *Attorney, Agent, or Firm* — Jordan IP Law, LLC

(57) ABSTRACT

A method and a system for authenticating users by implementing artificial intelligence techniques is provided. A graphical user interface (GUI) is rendered on a computing device of a user by a server. The GUI displays objects in random motion. The objects are selected in a sequential manner by the user to form a pattern. With each selection of the object, a corresponding confidence score is determined that is based on a set of factors. Further, the selected object becomes static and the remaining objects that are yet to be selected continue to move in random motion. On forming the pattern, the aggregate of confidence scores is determined to authenticate the user.

19 Claims, 17 Drawing Sheets

(56) References Cited

U.S. PATENT DOCUMENTS

| | | | |
|---|---|---|---|
| 2014/0226131 A1* | 8/2014 | Lopez | G06F 3/013 |
| | | | 351/210 |
| 2015/0084864 A1* | 3/2015 | Geiss | G06F 21/316 |
| | | | 345/158 |
| 2016/0203308 A1* | 7/2016 | Ahmad | G06F 21/36 |
| | | | 726/19 |
| 2017/0032113 A1* | 2/2017 | Tunnell | H04L 9/3231 |
| 2019/0312861 A1* | 10/2019 | Kairi | H04L 9/3228 |

* cited by examiner

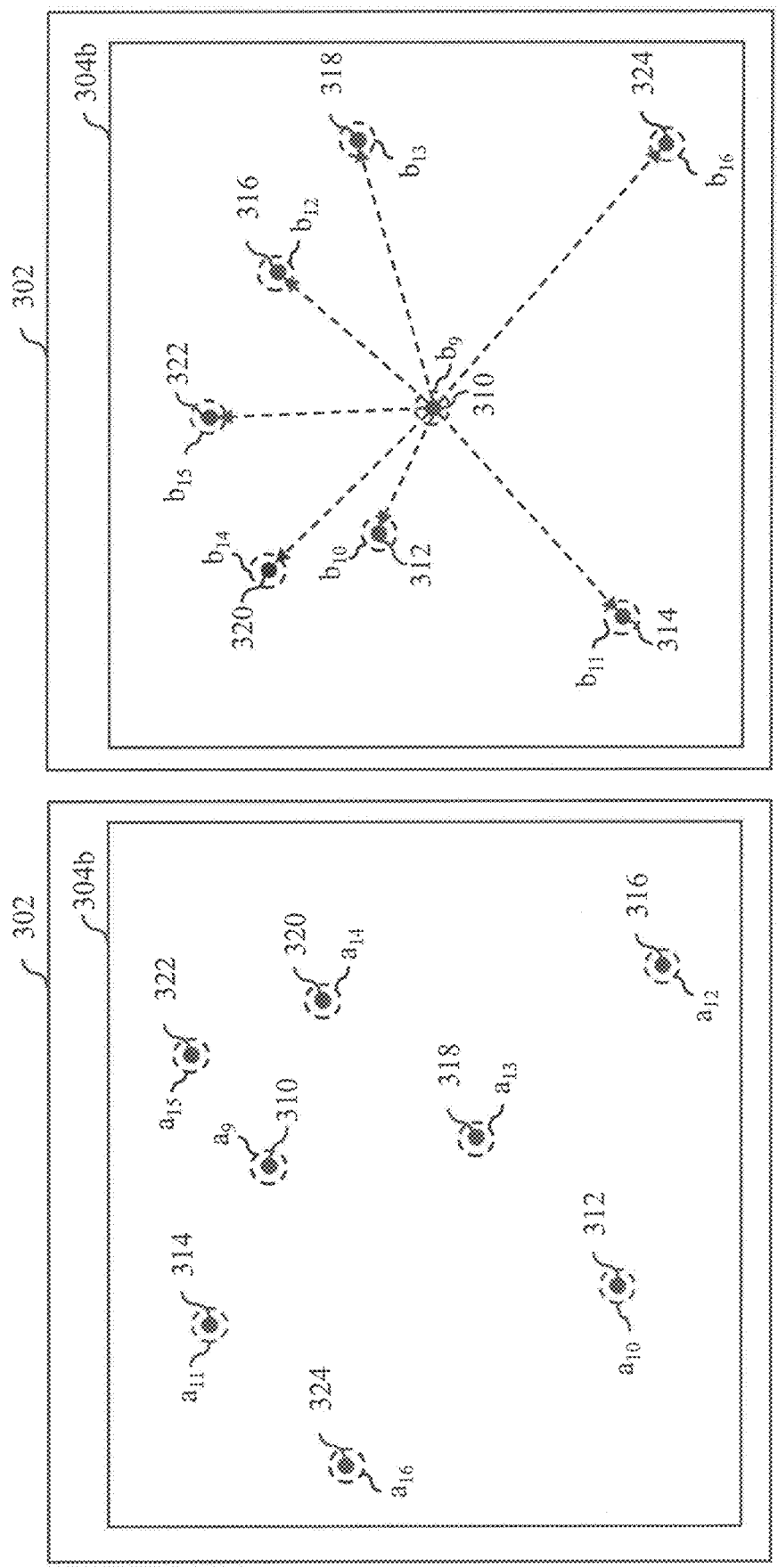

METHOD AND SYSTEM FOR AUTHENTICATING USERS

CROSS-REFERENCE TO RELATED APPLICATIONS

The present application claims priority to Singapore Patent Application No. 10201809937P (filed on Nov. 8, 2018), which is hereby incorporated by reference in its entirety.

FIELD OF THE INVENTION

The present invention relates to methods and systems for authentication, and, more particularly to a method and a system for authenticating users using artificial intelligence techniques.

BACKGROUND

Service providers typically require authentication information (for example, a username and a password) of a user for authenticating her and granting her access to an account. The account may be an electronic mail (e-mail) account, a financial account, a social media account, or the like. However, the authentication information can be tracked, leaked, or stolen by miscreants especially when the user inputs her authentication information in a communication device to access her account. Such miscreants may use the authentication information to perform unauthorized financial transactions or to create fake profiles of the user. To minimize such identity theft, the service providers typically add an extra layer of security when requesting for the authentication information. The extra layer of security includes asking a personal question that is specific to the user, generating a warning message when the user uses a different device to access the account instead of a personal computing device, prompting the user to input a one-time password (OTP) that is sent to a registered contact number of the user, receiving biometric information of the user, or the like. The extra layer of security is further used for differentiating humans from computers or robots through use of a Completely Automated Public Turing Test to tell Computers and Humans Apart (CAPTCHA). CAPTCHA systems generate test inputs that may include recognizing an image or speech, clicking on a checkbox for responding to an identification message, and identifying accurate characters from a series of characters, such as letters and numbers that may be italicized, slanted, and/or otherwise distorted.

Adding such extra layers of security assists the service providers in assuring that the user is a valid user; however, authentication via such additional layers becomes quite time consuming for the user. For instance, in a financial domain, where a valid user is performing several transactions in a day from her financial account, it is tedious for the user to keep responding to such extra layers of security. Additionally, if the user performs transactions with different service providers, it is cumbersome for the user to keep responding to each security layer along with providing the authentication information associated with each service provider. Further, in a scenario where the additional security questions are transmitted to the personal device or on the registered contact number of the user, the user is not permitted to access her account if the contact number is not operational or the personal device is not operational or is stolen. Furthermore, some service providers have replaced the existing password system with the need to only remember the username and enter the OTP sent on the registered contact number or personal device of the user. However, even in such cases, the authentication fails due to the aforementioned reasons.

Mechanisms such as biometric identification techniques are difficult to implement by service providers, especially for financial institutions, as billions of electronic transactions occur on a daily basis. Further, in instances where CAPTCHA are used for authentication, the characters may be distorted to an extent that a human is unable to accurately identify the characters. Thus, the additional security mechanisms along with the need to remember passwords have been causing inconvenience to the user.

In light of the foregoing, there exists a need for a technical and more reliable solution that authenticates the user and reduces the inconvenience caused to the user.

SUMMARY

In an embodiment of the present invention, a method for user authentication is provided. A graphical user interface is rendered by a server to a user on a computing device. The graphical user interface displays a plurality of objects in random motion. Further, a plurality of confidence scores for a sequential selection of the plurality of objects performed by the user is determined by the server. A confidence score of the plurality of confidence scores corresponds to a selection of an object of the plurality of objects. The server determines the plurality of confidence scores based on a set of factors. The user is authenticated by the server based on the plurality of confidence scores.

In another embodiment of the present invention, a system for authenticating a user is provided. The system includes a server that is configured to render a graphical user interface to the user on a computing device. The graphical user interface displays a plurality of objects in random motion. The server further determines a plurality of confidence scores for a sequential selection of the plurality of objects performed by the user. A confidence score of the plurality of confidence scores corresponds to a selection of an object of the plurality of objects. The server determines the plurality of confidence scores based on a set of factors. The user is authenticated by the server based on the plurality of confidence scores.

In yet another embodiment of the present invention, a method for processing transactions is provided. A transaction request for a transaction initiated by a user, is received by a server from a computing device. A graphical user interface is rendered by the server to the user on the computing device based on the transaction request. The graphical user interface displays a plurality of objects in random motion. Further, a plurality of confidence scores for a sequential selection of the plurality of objects performed by the user is determined by the server. A confidence score of the plurality of confidence scores corresponds to a selection of an object of the plurality of objects. The server determines the plurality of confidence scores based on a set of factors, and the user is authenticated by the server based on the plurality of confidence scores. Further, the transaction is processed when the user is authenticated.

BRIEF DESCRIPTION OF THE DRAWINGS

Various embodiments of the present invention are illustrated by way of example, and not limited by the appended figures, in which like references indicate similar elements, and in which:

FIGS. 3A-3E illustrate a GUI that is rendered on the computing device by the server in an implementation phase executed by the server, in accordance with an embodiment of the present invention;

Figure 1:
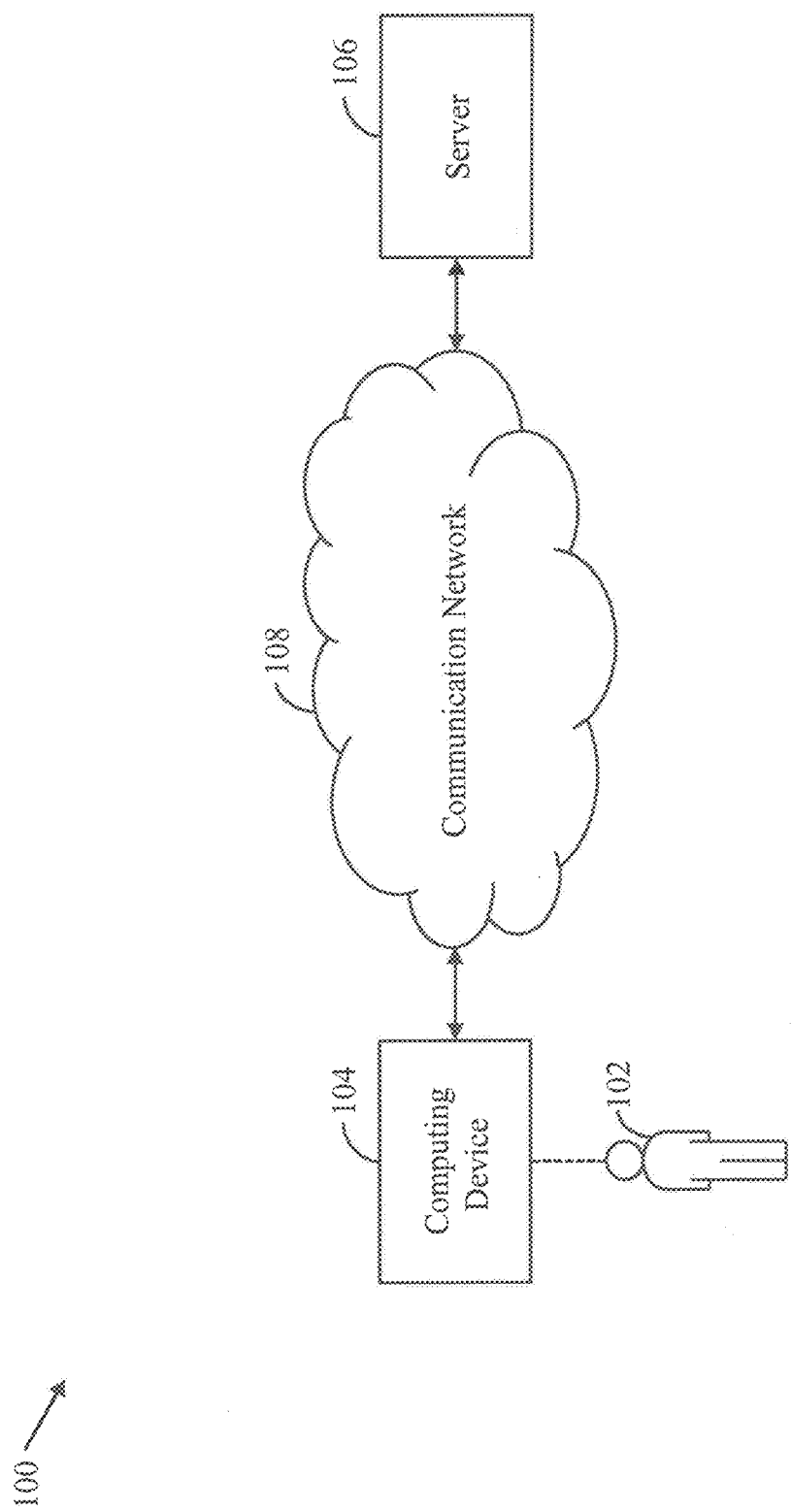
FIG. 1 is a block diagram that illustrates an exemplary environment for authenticating users, in accordance with an embodiment of the present invention.

Further areas of applicability of the present invention will become apparent from the detailed description provided hereinafter. It should be understood that the detailed description of exemplary embodiments is intended for illustration purposes only and is, therefore, not intended to necessarily limit the scope of the present invention.

DETAILED DESCRIPTION

The present invention is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. In one example, the teachings presented and the needs of a particular application may yield multiple alternate and suitable approaches to implement the functionality of any detail described herein. Therefore, any approach may extend beyond the particular implementation choices in the following embodiments that are described and shown.

References to "an embodiment", "another embodiment", "yet another embodiment", "one example", "another example", "yet another example", "for example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Overview

Various embodiments of the present invention provide a method and a system for authenticating users by employing artificial intelligence (AI) techniques. A server implements the AI techniques and executes a training phase to learn subconscious choices made by a user, and an implementation phase to authenticate the user based on its learning in the training phase. During the training phase, the server presents the user with objects that move in random motion through a graphical user interface (GUI) displayed on a computing device and prompts the user to select the objects sequentially. The user thus selects the objects one after the other to form a pattern. With every selection of the object, the server extracts data points based on a set of factors. Further, the selected object becomes static with respect to a plane it is displayed on and remaining objects that are yet to be selected continue to move in random motion. The server stores the extracted data points and the pattern in its knowledgebase. The server further executes multiple cycles of the training phase to learn subconscious choices that the user makes for selecting the object with respect to other objects. Based on the subconscious choices, the server captures the thought process of the user when the user is presented with objects that move in random motion.

The server executes the implementation phase after the training phase. During the implementation phase, the server renders a GUI, similar to the GUI rendered during the training phase, on the computing device for presenting various objects in random motion to the user and prompts the user to select the objects sequentially. The selection of the objects performed by the user indicates the subconscious choices of the user. With each selection of the objects, the server determines a confidence score for the corresponding selection by extracting data points associated with the selection, which are based on the set of factors. The confidence score is compared with a threshold value which is based on the data points extracted during the training phase. The server controls movement of the objects that are yet to be selected if the confidence score is less than the threshold value. When all the objects are selected to form a pattern, an aggregate of confidence scores is used to authenticate the user.

The method and the system of the present invention, do not require the user to remember any password or respond to extra layers of security. Further, the authentication is performed based on the subconscious choices of the user which are known only to the user. Hence, the authentication process employed by the method and system of the present invention is more accurate and convenient as compared to the current authentication processes. The increase in accuracy of the authentication process employed by the method and system of the present invention further helps in reducing identity theft.

Terms Description (in Addition to Plain and Dictionary Meaning)

A server is a physical or a cloud data processing system on which a server program runs. The server may be implemented in hardware or software, or a combination thereof. In one embodiment, the server may be implemented in computer programs executing on programmable computers, such as personal computers, laptops, or a network of computer systems. The server may be maintained by a financial institution, an establishment, or the like. The server uses AI techniques for authenticating users.

A computing device is a communication device that a user uses to perform various activities such as accessing various types of accounts (e.g., a financial account, an e-mail account, or a social media account), conducting financial transactions, or entering an establishment. In an embodiment, the computing device is associated with the user. In another embodiment, the computing device is associated with and maintained by a financial institution, the establishment, or the like.

Objects are visual elements that are presented by a server on a computing device. The objects move in random motion and may have different shapes and sizes. Examples of the objects include, but are not limited to, dots, circles, squares, triangles, rectangles, or any other geometric or non-geometric shapes.

A graphical user interface (GUI) is a user interface that includes windows, icons, text boxes, and/or other interactive features to receive inputs, provide information, or display output to users. A GUI is rendered on a computing device of a user for authenticating the user. The GUI displays various objects that are in random motion to the user. The GUI enables the user to select the randomly moving objects to form a pattern.

A sequential selection indicates selection of the objects, presented through a GUI, one after the other in a random order. When a user performs the sequential selection of the objects, the user selects a first object followed by a second object. The order in which the user selects the objects to form a pattern indicates subconscious choices of the user.

Confidence scores indicate a likelihood of a user being a valid user. A confidence score is determined when the user selects an object from various randomly moving objects that are presented through a GUI. When all the objects are selected by the user to form a pattern, an aggregate of the confidence scores associated with the sequential selection of the objects is determined. A server authenticates the user based on the aggregate of the confidence scores. In one example, the aggregate of the confidence scores is in a range of 0 to 1.

Set of factors are factors considered by a server while determining a confidence score. The server determines the confidence score when a user selects an object from various randomly moving objects that are presented through a GUI. The factors include positions of the selected object and objects that are yet to be selected with respect to a previously selected object, speeds of the selected object and the remaining objects, a time duration of the previous selection as well as a time duration between consecutive selections, and the like.

AI techniques may include any suitable machine-learning based techniques, statistical techniques, or probabilistic techniques. A server may use the AI techniques to learn subconscious choices made by a user when the user is made to select various randomly moving objects presented to her by way of a GUI. The server may further use the AI techniques to determine confidence scores pertaining to the selection of the objects. The confidence scores indicate a likelihood of the user being a valid user.

FIG. 1 is a block diagram that illustrates an exemplary environment 100 for authenticating users, in accordance with an embodiment of the present invention. The environment 100 depicts a user 102, a computing device 104, and a server 106 for authenticating the user 102. The server 106 and the computing device 104 communicate with each other by way of a communication network 108.

The user 102 is an individual who is to be authenticated. The user 102 may be an account holder of an account or an individual attempting to enter an establishment such as a laboratory, an office, or the like. Examples of the account may include, but are not limited to, a banking account, a digital wallet, a financial account, a social media account, an electronic commerce (e-commerce) account, and an electronic mail (e-mail) account.

The computing device 104 is a communication device that the user 102 uses to access the account or to enter the establishment. The user 102 may access an application (for example, a mobile application or a web application) by way of the computing device 104 for accessing the account or entering the establishment. In one embodiment, the application may be installed in a memory (not shown) of the computing device 104. In another embodiment, the application may be accessed by way of a browser installed in the memory of the computing device 104. The computing device 104 may be associated with the user 102. Alternatively, the computing device 104 may be associated with and maintained by a financial institution, the establishment, or the like. Examples of the computing device 104 include a mobile phone, a smartphone, a desktop computer, a laptop, a tablet, a phablet, an automated teller machine (ATM), a personal digital assistant (PDA), or any other communication device.

The server 106 is a network of computers, a software framework, or a combination thereof, that may provide a generalized approach to create the server implementation. In an embodiment, the operation of the server 106 may be dedicated to execution of procedures, such as, but not limited to, programs, routines, or scripts stored in one or more memories for supporting its applied applications, such as performing authentication of the user 102 by implementing artificial intelligence (AI) techniques. Examples of the server 106 include, but are not limited to, personal computers, laptops, mini-computers, mainframe computers, any non-transient and tangible machine that can execute a machine-readable code, cloud-based servers, distributed server networks, or a network of computer systems. The server 106 may be realized through various web-based technologies such as, but not limited to, a Java web-framework, a .NET framework, a personal home page (PHP) framework, or any other web-application framework. The server 106 may be maintained by the financial institution, the establishment, or the like. Various operations of the server 106 have been described in detail in conjunction with FIGS. 2-6. Further, various components of the server 106 are explained in detail in conjunction with FIG. 7.

The server 106 executes a training phase and an implementation phase for learning and implementing the process of authentication of users, such as the user 102, respectively. The training phase and the implementation phase are executed using AI techniques such as expert systems, fuzzy logic, support vector machines (SVM), hidden markov models (HMMs), greedy search algorithms, rule-based systems, bayesian models (e.g., bayesian networks), neural networks, decision tree learning methods, other non-linear training techniques, data fusion, utility-based analytical systems, or the like.

The server 106 may execute the training phase when the user 102 signs up for the application by using the computing device 104. As a part of the sign up, the server 106 prompts the user 102 to provide a username and a password (i.e., authentication information) for creating a user profile of the user 102. The server 106 stores the username and the password in a memory (shown in FIG. 7) of the server 106 or an external database (not shown) and initiates the training phase. The external database may be maintained by the server 106 or a third-party service provider. Alternatively, the server 106 stores the username and the password in a knowledgebase (shown in FIG. 7). During the training phase, the server 106 prompts the user 102 to provide her authentication information. Based on the received authentication information, the server 106 checks whether the authentication information provided by the user 102 matches the authentication information of the user 102 stored in the memory. When the authentication information provided by the user 102 matches the authentication information of the user 102 stored in the memory, the server 106 renders a graphical user interface (GUI) on the computing device 104. The GUI displays various objects that are in random motion to the user 102. The server 106 prompts the user 102 to select the objects sequentially. The user 102 sequentially selects all the objects for forming a pattern. In an embodiment, for selecting the objects sequentially, the user 102 performs a selection of an object (such as a first object) and subsequently selects another object (such as a second object) by connecting the first object to the second object. In another embodiment, the user 102 selects the objects sequentially by tapping them.

When the user 102 selects the object, the object becomes static with respect to a plane it is displayed on, and remaining objects that are yet to be selected continue to move in random motion. The server 106 extracts data points associated with each selection that are based on a set of factors. The set of factors include time durations between consecutive selections, positions of the objects, speeds of the objects, and the like, and records the data points in its knowledgebase. The server 106 further records the pattern and stores the pattern in its knowledgebase. The server 106 executes multiple such training cycles over a period of time and records multiple data points and a corresponding pattern (hereinafter referred to as "test data of the user 102") in each training cycle. The server 106 trains itself to authenticate the user 102 based on the test data of the user 102. Further, the pattern formed by the user 102 in each training cycle indicates the subconscious choices made by the user 102 when the user 102 is presented with objects that move in random motion. The server 106 thus adaptively trains itself to authenticate the user 102 based on the subconscious choices of the user 102. The server 106 continues to execute the training phase until the server 106 achieves a desired level of accuracy. The training phase executed by the server 106 has been explained in detail in conjunction with FIG. 2.

In the implementation phase, the server 106 requests the username of the user 102 when the user 102 accesses the application by way of the computing device 104. The server 106 identifies the user 102 based on the username of the user 102 and renders the GUI, similar to the GUI rendered during the training phase, on the computing device 104 for authenticating the user 102. Upon rendering the GUI, the server 106 prompts the user 102 to sequentially select various randomly moving objects displayed on the GUI. When the user 102 selects the objects sequentially, the server 106 extracts the data points associated with each selection performed by the user 102 based on the set of factors and determines confidence scores for each selection. The set of factors include a path traced by the user 102 for connecting two sequential objects, positions of selected object and remaining objects with respect to a previously selected object, speeds of the selected object and the remaining objects, a time duration for selecting the object, and the like. Further, the selected objects become static with respect to the plane it is displayed on, and the remaining objects that are yet to be selected continue to move in random motion. The server 106 determines the confidence scores based on the test data and the extracted data points. In an example, the confidence scores are in the range of 0 to 1. The server 106 further determines an aggregate of the confidence scores corresponding to the objects that are selected by the user 102 and checks if the aggregate is less than a threshold value determined by the server 106 based on the test data of the user 102. The server 106 controls the movement of objects that are yet to be selected when the aggregate is less than the threshold value. For controlling the movement of the objects that are yet to be selected, the server 106 may control speed and direction of movement of the objects that are yet to be selected. The server 106 controls the movement of the objects such that subsequent selections performed by the user 102 assist the server 106 in authenticating the user 102. For example, while in the training phase, the user 102 may have selected an object that was moving in a specific direction with a specific speed. Hence, the server 106, while in the implementation phase, controls the movements of the objects that are yet to be selected to replicate the speed and direction of the objects as per the training phase, thereby ensuring that the user 102 makes the same selection as made in the training phase due to her subconscious choices. The server 106 authenticates the user 102 when the user 102 selects all the objects and the aggregate of confidence scores is greater than or equal to the threshold value. The implementation phase executed by the server 106 has been explained in detail in conjunction with FIG. 3.

The communication network 108 is a medium through which content and messages are transmitted between various entities, such as the computing device 104 and the server 106. Examples of the communication network 108 include, but are not limited to, a wireless fidelity (Wi-Fi) network, a light fidelity (Li-Fi) network, a worldwide interoperability for microwave access (Wi-Max) network, a local area network (LAN), a wide area network (WAN), a metropolitan area network (MAN), a satellite network, the Internet, a fiber optic network, a coaxial cable network, an infrared (IR) network, a radio frequency (RF) network, and combinations thereof. Various entities in the environment 100 may connect to the communication network 108 in accordance with various wired and wireless communication protocols, such as Transmission Control Protocol and Internet Protocol (TCP/IP), User Datagram Protocol (UDP), Next Generation Network (NGN) Protocol, Artificial Intelligence Routing protocol, 2nd Generation (2G), 3rd Generation (3G), 4th Generation (4G), 5th Generation (5G) communication protocols, Long Term Evolution (LTE) communication protocols, or any combination thereof.

Figure 2A:
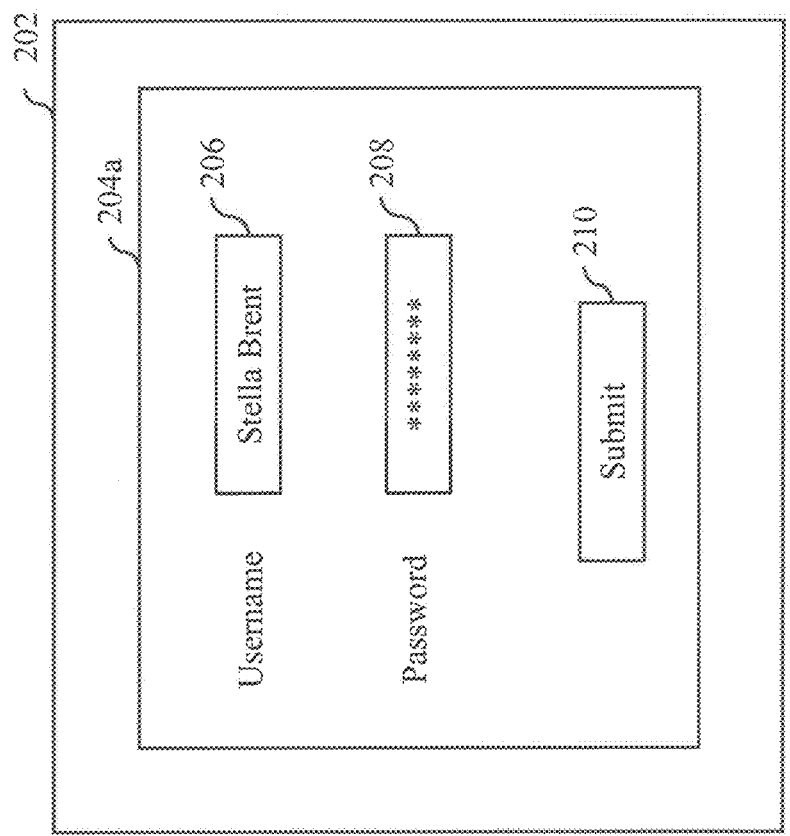
FIGS. 2A-2E illustrate a graphical user interface (GUI) that is rendered on a computing device by a server of the communication environment of FIG. 1 in a training phase executed by the server, in accordance with an embodiment of the present invention.

FIGS. 2A-2E illustrate a GUI 202 (hereinafter referred to as a "first GUI 202") that is rendered on the computing device 104 by the server 106 in the training phase executed by the server 106, in accordance with an embodiment of the present invention. In a non-limiting example, it is assumed that the user 102 has signed up on an application hosted by the server 106 of the financial institution for accessing her financial account maintained at the financial institution. During sign up, the user 102 provides the username and the password to the server 106 as her authentication information. Once the sign up is successful and the user profile of the user 102 is created for the financial account, the server 106 executes the training phase. At the initiation of the training phase, the server 106 requests the user 102 to enter her authentication information, by rendering the first GUI 202 as shown in FIG. 2A.

With reference to FIG. 2A, the server 106 renders the first GUI 202 on the computing device 104, in accordance with an embodiment of the present invention. The first GUI 202 displays a first UI screen 204a. The first UI screen 204a may include a username field 206, a password field 208, and a submit button 210. The user 102 inputs her username and password, in the username and password fields 206 and 208, respectively, and clicks on the submit button 210. The first UI screen 204a serves as a gateway to the server 106 and the authentication information is thus transmitted to the server 106. The server 106 receives the authentication information and compares the received authentication information with the authentication information of the user 102 stored in at least one of the memory of the server 106, the knowledge-base of the server 106, an external database that is maintained by the server 106, or an external memory. The server 106 authenticates the user 102 when the received authentication information from the user 102 matches the stored authentication information and communicates a first notification to the user 102 to indicate that the authentication is successful. The authentication is unsuccessful when there is a mismatch between the received authentication information and the stored authentication information. The server 106 communicates a second notification to the user 102 to indicate that the authentication is unsuccessful when the received authentication information does not match the stored authentication information and may request the user 102 to enter the authentication information again.

Figure 2C:
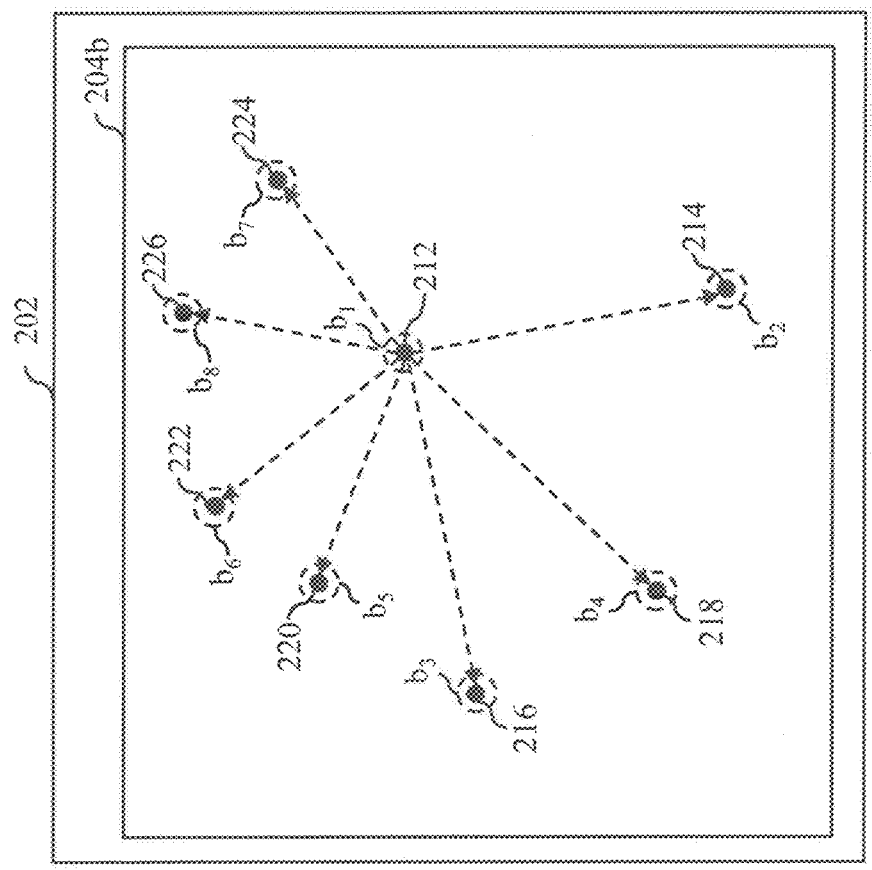
Figure 2B:
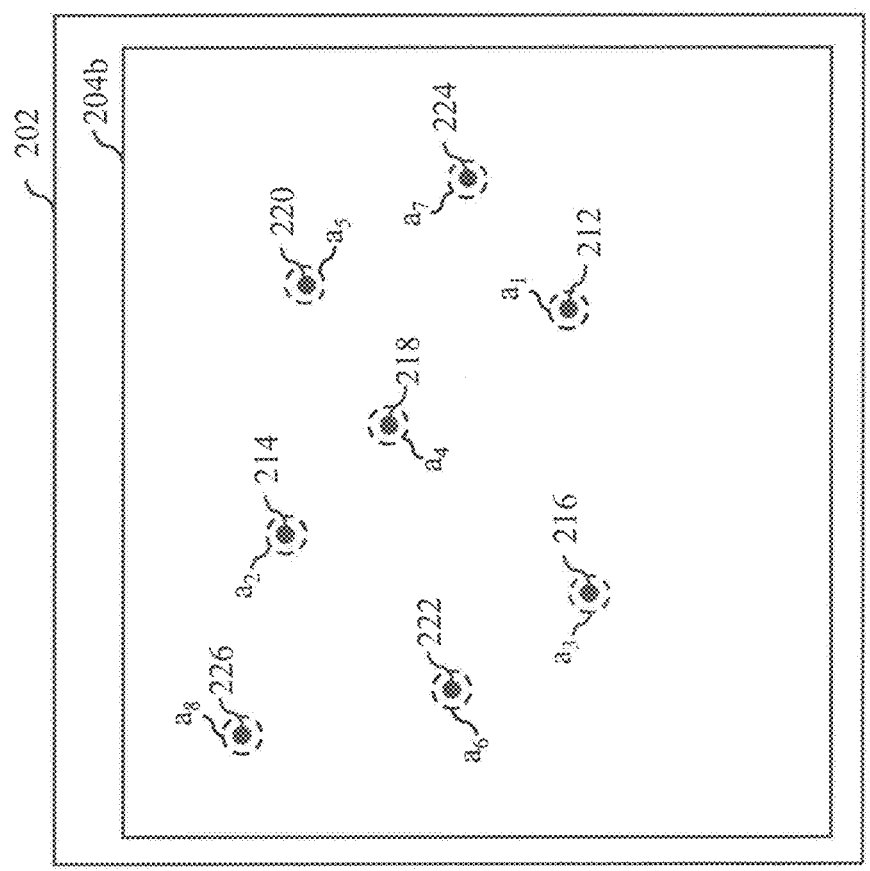

With reference to FIG. 2B, when the authentication of the user 102 is successful, the server 106 redirects the control from the first UI screen 204a to a second UI screen 204b displayed by way of the first GUI 202, in accordance with an embodiment of the present invention. In an example, the second UI screen 204b is an interactive graphic interchange format (GIF) or any other known suitable format for implementing the current invention. The second UI screen 204b presents first through eighth objects 212-226 (collectively referred to as "objects 212-226"). The objects 212-226 may have different shapes and sizes. Examples of the objects 212-226 include, but are not limited to, dots, circles, squares, triangles, rectangles, or any other geometric or non-geometric shapes. The objects 212-226 move in random motion along X and Y axes and are spaced apart from each other. In an example, at a first time instant ($t_1$), the first object 212 is at a position $a_1$ and the second object 214 is at a position $a_2$. Similarly, the third through eighth objects 216-226 are at positions $a_3$-$a_8$, respectively. It will be apparent to a person skilled in the art that each position has corresponding X and Y co-ordinates. In an example, $x_1$ and $y_1$ are the X and Y co-ordinates of the first position $a_1$, respectively. Similarly, the second through eighth positions $a_2$-$a_8$ have corresponding X and Y co-ordinates. The server 106 prompts the user 102 to select the objects 212-226 in a sequential manner until all the objects 212-226 are selected. The selection may refer to connecting the objects 212-226 to create a random pattern.

With reference to FIG. 2C, the user 102 selects the first object 212 at a second time instant ($t_2$). At the second time instant ($t_2$), the first object 212 is at a position $b_1$ and the second object 214 is at a position $b_2$. Similarly, the third through eighth objects 216-226 are at positions $b_3$-$b_8$, respectively. Since the objects 212-226 are moving randomly, the positions $b_1$-$b_8$ of the objects 212-226 at the second time instant ($t_2$) are different from the positions $a_1$-$a_8$ at the first time instant ($t_1$). Further, when the user 102 selects the first object 212, the server 106 halts the motion of the first object 212, thereby causing the first object 212 to become static at the position $b_1$ with respect to X-Y plane displaying the objects 212-226. The remaining objects, i.e., the second through eighth objects 214-226 that are yet to be selected continue to move in random motion. The dotted lines (as shown in FIG. 2C) indicate the available options to the user 102 for the next selection.

When the user 102 selects the first object 212, the server 106 extracts data points associated with the selection of the first object 212. The data points are based on the set of factors. The set of factors include positions of the second through eighth objects 214-226 with respect to the first object 212 at the second time instant ($t_2$), and speeds of the second through eighth objects 214-226 at the second time instant ($t_2$). The data points indicate a value associated with the set of factors. For example, data points based on the factor 'positions of the second through eighth objects 214-226 with respect to the first object 212' may indicate a distance of each of the second through eighth objects 214-226 from the first object 212 and a direction of each of the second through eighth objects 214-226 with respect to the first object 212. Thus, if the position $b_1$ of the first object 212 has X and Y co-ordinates as ($x_1$, $y_1$) and the position $b_2$ of the second object 214 has X and Y co-ordinates as ($x_2$, $y_2$), the direction of the second object 214 with respect to the first object 212 is a vector ($x_2-x_1$, $y_2-y_1$). Further, the distance of the second object 214 from the first object 212 is $((x_2-x_1)^2+(y_2-y_1)^2)^{1/2}$. Thus, the extracted data point for the position of the second object 214 with respect to the first object 212 is the vector ($x_2-x_1$, $y_2-y_1$) and $((x_2-x_1)^2+(y_2-y_1)^2)^{1/2}$. Similarly, data points of the remaining objects associated with their positions with respect to the first object 212 are determined. Further, for the factor 'speed', in an example, the speed of the second object 214 is 2 millimeter/second (mm/sec). Thus, the extracted data point for the speed of the second object 214 is 2 mm/sec. Similarly, data points associated with the speeds of the remaining objects are determined. The server 106 stores the extracted data points in its knowledgebase. The server 106 further trains itself to learn subconscious choices of the user 102 and capture her thought process, that is based on the extracted data points and the selection of the first object 212 which the user 102 has made.

Figure 2E:
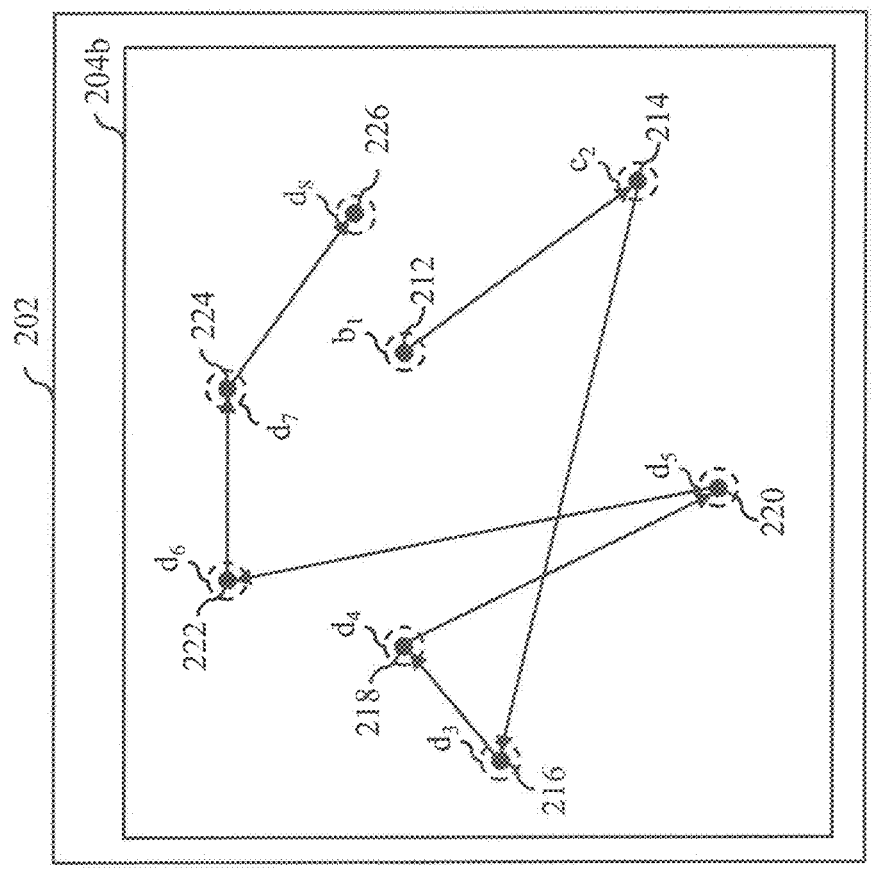
Figure 2D:
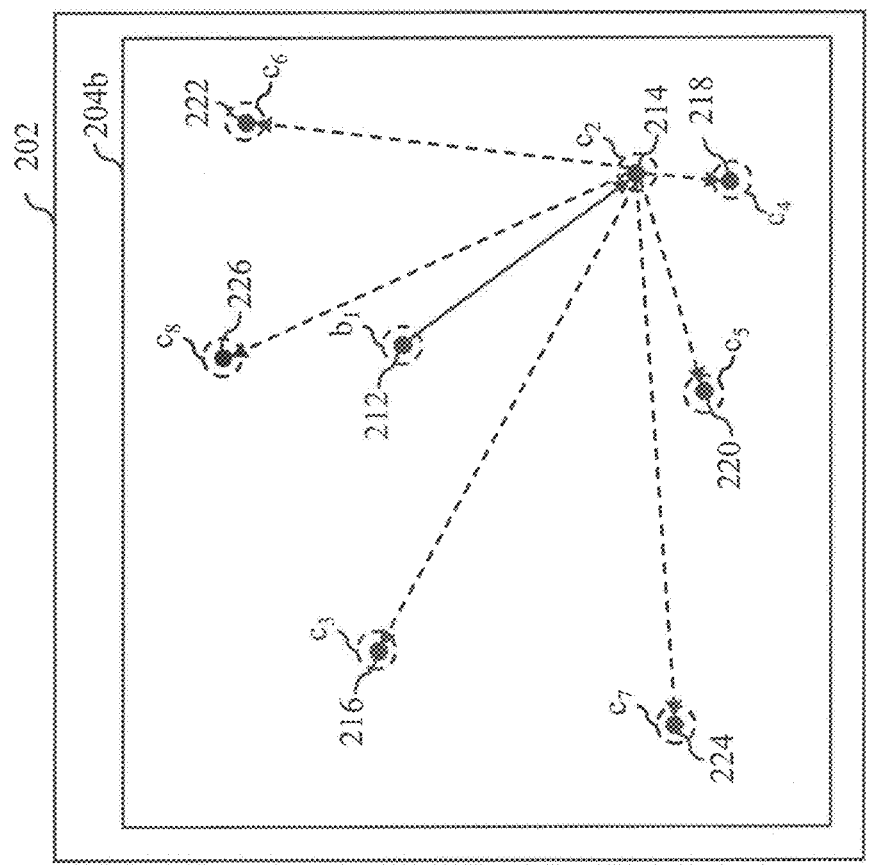

With reference to FIG. 2D, the user 102 selects the second object 214 by connecting the first object 212 to the second object 214. The second UI screen 204b displays the positions of the objects 212-226 when the user 102 selects the second object 214 at a third time instant ($t_3$). Since the first object 212 is static, the position of the first object 212 at the third time instant ($t_3$) is same as the position of the first object 212 at the second time instant ($t_2$). Thus, at the third time instant ($t_3$), the first object 212 is at the position $b_1$, and the second through eighth objects 214-226 are at positions $c_2$-$c_8$, respectively. When the user 102 selects the second object 214, the second object 214 becomes static at the position $c_2$ with respect to the X-Y plane. Further, the solid line (as shown in FIG. 2D) indicates the selection performed by the user 102, and the dotted lines (as shown in FIG. 2D) indicate the available options to the user 102 for the next selection.

When the user 102 selects the second object 214, the server 106 extracts data points associated with the selection of the second object 214. The data points are based on the set of factors. The set of factors include a movement trajectory, i.e., a path traced by the user 102 to connect the first object 212 (i.e., a previously selected object) to the second object 214 (i.e., a currently selected object), positions of the third through eighth objects 216-226 with respect to the second object 214 at the third time instant ($t_3$), speeds of the third through eighth objects 216-226 at the third time instant ($t_3$), and a time duration for selecting the second object 214. The time duration for selecting the second object 214 includes a time duration for which the first object 212 is selected and a time duration between the selection of the first and second objects 212 and 214. The server 106 stores the extracted data points in its knowledgebase. The server 106 further captures the thought process of the user 102 based on the extracted data points associated with the selection of the second object 214 and a subconscious choice of the user 102 for selecting the second object 214 instead of selecting any one of the third through eighth objects 216-226.

With reference to FIG. 2E, the second UI screen 204b displays a pattern formed by the user 102 by connecting the objects 212-226 sequentially. When the user 102 selects the second object 214 at the third time instant ($t_3$), the second object 214 becomes static, whereas the third through eighth objects 216-226 continue to move randomly. The user 102 thus selects each object sequentially until all the objects 212-226 are connected to form the pattern. With each selection that the user 102 makes, the selected object becomes static with respect to the X-Y plane and the remaining objects that are yet to be selected continue to move in random motion. Further, with each selection, the server 106 extracts data points that are associated with the selection of the corresponding object as described in FIGS. 2C and 2D. Thus, when the pattern is formed, all the selected objects 212-226 become static with respect to the X-Y plane and the server 106 records and stores the pattern in its knowledgebase. At a fourth time instant ($t_4$), the third through eighth objects 216-226 are at positions $d_3$-$d_8$, respectively, whereas the first and second objects 212 and 214 are at positions $b_1$ and $c_2$, respectively. The solid lines (as shown in FIG. 2E) indicate the selections performed by the user 102.

The pattern formed by the user 102 indicates the subconscious choices made by the user 102. Based on the extracted data points with each selection and the subconscious choices made by the user 102 for each selection, the server 106 captures the thought process of the user 102. FIG. 2E indicates one such pattern formed by the user 102 when presented with the objects 212-226. It will be apparent to a person skilled in the art that to authenticate the user 102 based on her subconscious choices, the server 106 executes multiple such training cycles over a period of time. With each training cycle, the server 106 presents objects in random motion to the user 102 and records a pattern (i.e., test data of the user 102) formed by the user 102. The pattern may be different for different training cycles. With each training cycle, the server 106 adaptively learns the subconscious choices of the user 102 for selecting each object to form the pattern and trains itself to capture the thought process of the user 102. It will also be apparent to a person skilled in the art that the server 106 may continue to train itself after completion of the training phase, to improve the accuracy and performance of the server 106 and hence provide optimal results. It will further be apparent to a person skilled in the art that the user 102 may form different patterns as compared to the pattern shown in FIG. 2E.

The subconscious choices of the user 102 while selecting the objects 212-226 may depend on multiple parameters, such as physical condition of the user 102, environmental conditions around the user 102, and a state of mind of the user 102. For example, when the user 102 is in a peaceful state of mind, the user 102 may form the pattern shown in FIG. 2E, whereas when the user 102 is in a restless or a sad state of mind, the user 102 may form a different pattern than the pattern shown in FIG. 2E. Similarly, the pattern formed by the user 102 when the user 102 is energetic, may be different than the pattern formed when the user 102 is exhausted. Further, the pattern formed by the user 102 in a work place environment may be different than the pattern formed in a household environment. The patterns formed by the user 102 may thus change in every training cycle. However, the subconscious choices made (i.e., the objects selected by the user 102 in the process of forming the pattern) uniquely distinguish the user 102 from other users. The server 106 thus trains itself, over the period of time, by collecting sufficient test data to authenticate the user 102 based on the subconscious choices made by the user 102.

The server 106 further determines, based on the training, threshold values for selections of corresponding objects. For example, the server 106 determines first through eighth threshold values for the selections of the objects 212-226, respectively. The threshold values are in the range of 0 to 1. Further, for determining a threshold value, such as the third threshold value, the server 106 extracts data points associated with the second and third selections performed by the user 102. The server 106 stores the determined first through eighth threshold values in its knowledgebase. The third threshold value may alternatively be determined based on an aggregate of first and second threshold values where the first and second threshold values are associated with the first and second selections. Thus, for each training cycle, a corresponding third threshold value is determined, and a final third threshold value is determined based on all the third threshold values in the training phase.

Figure 3A:
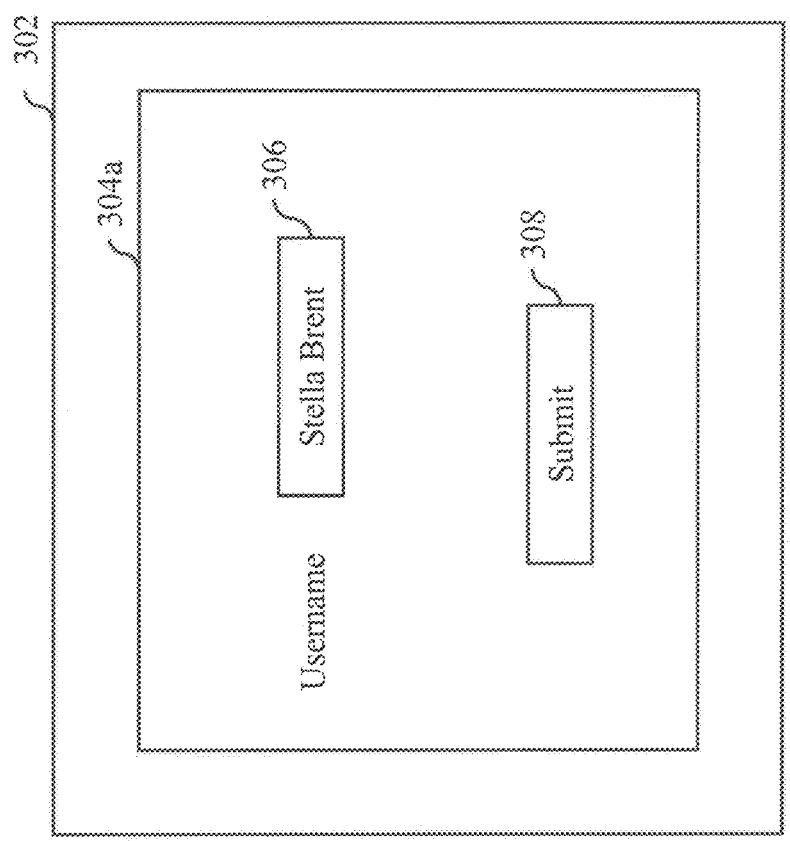

FIGS. 3A-3E illustrate a GUI 302 (hereinafter referred to as a "second GUI 302") that is rendered on the computing device 104 by the server 106 in the implementation phase executed by the server 106, in accordance with an embodiment of the present invention. When the user 102 accesses the application to sign-in to her financial account, the server 106 executes the implementation phase by rendering the second GUI 302 as shown in FIG. 3A.

With reference to FIG. 3A, the server 106 renders the second GUI 302 on the computing device 104, in accordance with an embodiment of the present invention. The second GUI 302 displays a third UI screen 304a. The third UI screen 304a may include a username field 306 and a submit button 308. The user 102 inputs her username in the username field 306 and clicks on the submit button 308. The third UI screen 304a serves as a gateway to the server 106 and the username is transmitted to the server 106. The server 106 receives and compares the username entered by the user 102 with usernames stored in at least one of the memory of the server 106, the knowledgebase of the server 106, the external database, or an external memory. When the received username of the user 102 does not match any one of the stored usernames, the server 106 communicates a third notification to the user 102 to indicate that the received username is invalid. When the received username of the user 102 matches any one of the stored usernames, the server 106 identifies the user 102 and redirects the control from the third UI screen 304a to a fourth UI screen 304b displayed by way of the second GUI 302 as shown in FIG. 3B.

With reference to FIG. 3B, the fourth UI screen 304b presents ninth through sixteenth objects 310-324 (collectively referred to as "objects 310-324") that are moving in random motion along the X and Y axes and are spaced apart from each other. In an example, the fourth UI screen 304b is an interactive graphic interchange format (GIF). In a non-limiting example, the objects 310-324 are shown to be structurally similar to the objects 212-226. At a fifth time instant ($t_5$), the ninth object 310 is at a position $a_9$ and the tenth object 312 is at a position $a_{10}$. Similarly, the eleventh through sixteenth objects 314-324 are at positions $a_{11}$-$a_{16}$, respectively. It will be apparent to a person skilled in the art that each position has corresponding X and Y co-ordinates. The server 106 prompts the user 102 to select the objects 310-324 in a sequential manner until all the objects 310-324 are selected. The selection may refer to connecting the objects 310-324 to create a random pattern. Further, as shown in FIGS. 2B-2E and 3B-3E, the first and second GUIs 202 and 302 rendered during the training phase and the implementation phase, respectively, are similar.

With reference to FIG. 3C, the user 102 selects the ninth object 310 at a sixth time instant ($t_6$). At the sixth time instant ($t_6$), the ninth object 310 is at a position $b_9$ and the tenth object 312 is at a position bio. Similarly, the eleventh through sixteenth objects 314-324 are at positions $b_{11}$-$b_{16}$, respectively. Since the objects 310-324 are moving randomly, the positions $b_9$-$b_{16}$ of the objects 310-324 at the sixth time instant ($t_6$) are different from the positions $a_9$-$a_{16}$ at the fifth time instant ($t_5$). Further, when the user 102 selects the ninth object 310, the server 106 halts the motion of the ninth object 310, thereby causing the ninth object 310 to become static at the position $b_9$ with respect to X-Y plane displaying the objects 310-324. The remaining objects, i.e., the tenth through sixteenth objects 312-324 that are yet to be selected continue to move in random motion. The dotted lines (as shown in FIG. 3C) indicate the available options to the user 102 for the next selection.

When the user 102 selects the ninth object 310, the server 106 extracts data points associated with the selection of the ninth object 310 that are based on the set of factors. The set of factors include positions of the tenth through sixteenth objects 312-324 with respect to the ninth object 310 at the sixth time instant ($t_6$), and speeds of the tenth through sixteenth objects 312-324 at the sixth time instant ($t_6$). The server 106 stores the extracted data points in its knowledgebase. The server 106 determines a first confidence score for the selection of the ninth object 310. In an example, the first confidence score is zero.

The server 106 further retrieves the first threshold value associated with the first selection and compares the first threshold value with the determined first confidence score. Based on the comparison, the server 106 determines whether the determined first confidence score is greater than or equal to the retrieved first threshold value. When the server 106 determines that the determined first confidence score is greater than or equal to the retrieved first threshold value, the server 106 continues to present the tenth through sixteenth objects 312-324 randomly. However, if the server 106 determines that the determined first confidence score is less than the retrieved first threshold value, the server 106 controls the movements of the tenth through sixteenth objects 312-324 (i.e., the objects that are yet to be selected). The server 106 controls the movements of the tenth through sixteenth objects 312-324 in such a manner that the likelihood for the confidence score of the next selection to become greater than or equal to the retrieved threshold value associated with the next selection, increases.

Figures 3D, 3E:
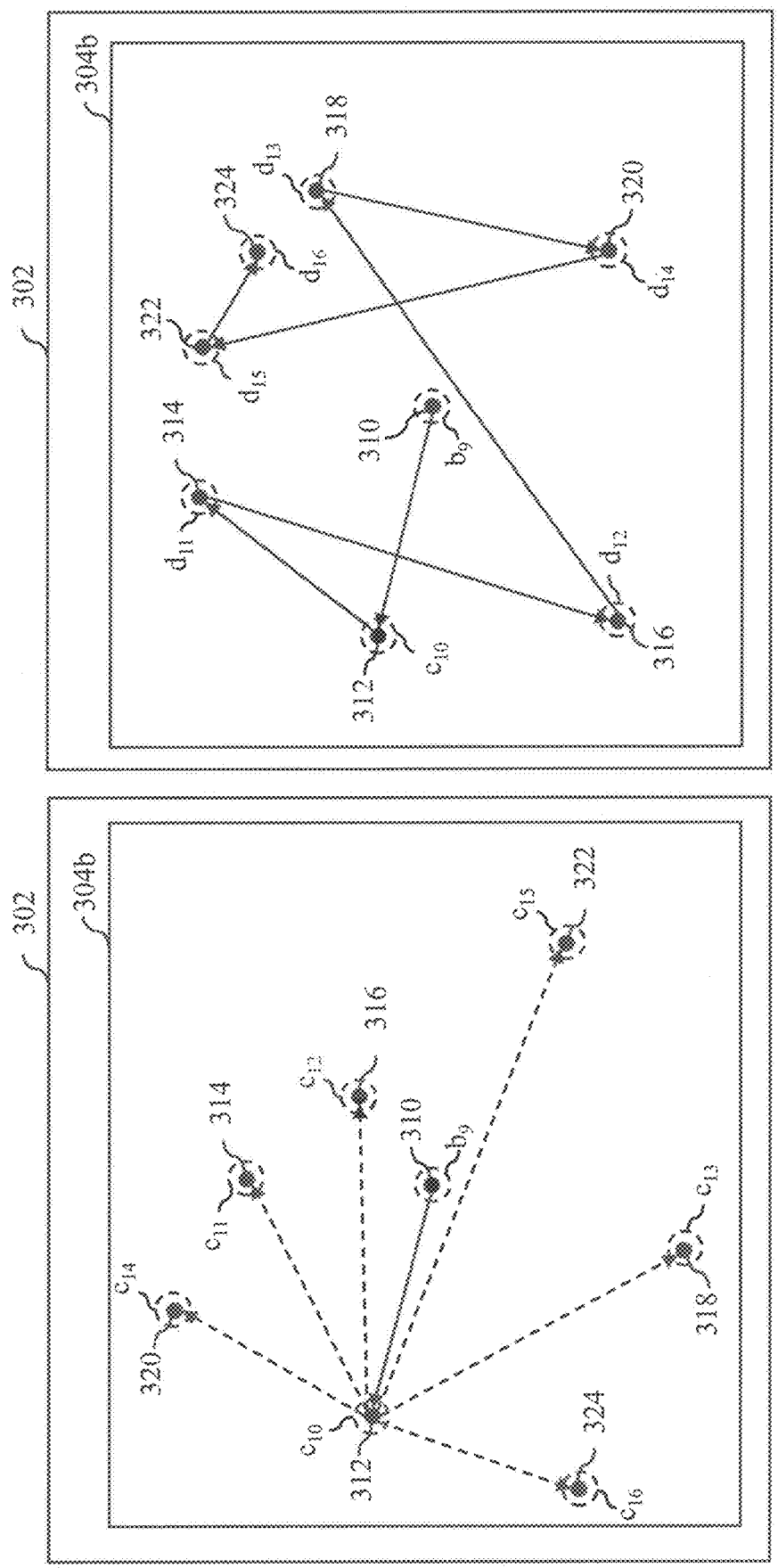

With reference to FIG. 3D, the user 102 selects the tenth object 312 at a seventh time instant ($t_7$) by connecting the ninth object 310 to the tenth object 312. The fourth UI screen 304b displays the positions of the objects 310-324 at the seventh time instant ($t_7$). Since the ninth object 310 is static, the position of the ninth object 310 at the seventh time instant ($t_7$) is same as the position of the ninth object 310 at the sixth time instant ($t_6$). Thus, at the seventh time instant ($t_7$), the ninth object 310 is at the position $b_9$ and the tenth through sixteenth objects 312-324 are at positions $c_{10}$-$c_{16}$, respectively. Further, when the user 102 selects the tenth object 312, the tenth object 312 becomes static at the position $c_{10}$ with respect to the X-Y plane. Further, the solid line (as shown in FIG. 3D) indicates the selection performed by the user 102, and the dotted lines (as shown in FIG. 3D) indicate the available options to the user 102 for the subsequent selection of the eleventh through sixteenth objects 314-324.

When the user 102 selects the tenth object 312, the server 106 extracts data points associated with the selection of the tenth object 312 that are based on the set of factors. The set of factors include movement trajectory, i.e., a path traced by the user 102 to connect the ninth object 310 to the tenth object 312, positions of the eleventh through sixteenth objects 314-324 with respect to the tenth object 312 at the seventh time instant ($t_7$), speeds of the eleventh through sixteenth objects 314-324 at the seventh time instant ($t_7$), and a time duration for selecting the tenth object 312. The time duration for selecting the tenth object 312 includes a time duration for which the ninth object 310 is selected and a time duration between the selection of the ninth and tenth objects 310 and 312. The server 106 stores the extracted data points in its knowledgebase. The server 106 further retrieves the positions of the tenth through sixteenth objects 312-324 with respect to the ninth object 310 at the sixth time instant ($t_6$), and the speeds of the tenth through sixteenth objects 312-324 at the sixth time instant ($t_6$) from the knowledgebase. The server 106 determines a second confidence score for the selection of the tenth object 312. The determination of the second confidence score is based on the set of factors that include positions and speeds of objects and the time duration for selecting the tenth object 312. The server 106 thus determines the second confidence score based on the data points associated with the selection of the ninth and tenth objects 310 and 312. The data points associated with the selection of the ninth object 310 include the positions of the tenth through sixteenth objects 312-324 with respect to the position of the ninth object 310 at the sixth time instant ($t_6$), and speeds of the tenth through sixteenth objects 312-324 at the sixth time instant ($t_6$). The data points associated with the selection of the tenth object 312 include the path traced by the user 102 to connect the ninth object 310 to the tenth object 312 and the time duration for selecting the tenth object 312.

The server 106 then compares an aggregate of the first and second confidence scores (i.e., an aggregate score for the selection of the tenth object 312) with a retrieved second threshold value from the knowledgebase. Based on the comparison, the server 106 determines whether the aggregate of the first and second confidence scores is greater than or equal to the retrieved second threshold value. When the server 106 determines that the aggregate of the first and second confidence scores is greater than or equal to the retrieved second threshold value, the eleventh through sixteenth objects 314-324 continue to move in random motion and take a random path. For example, the aggregate of the first and second confidence scores is 0.214 and the retrieved second threshold value is 0.2. As the aggregate of the first and second confidence scores is greater than the retrieved threshold value, the eleventh through sixteenth objects 314-324 continue to move in random motion and take a random path. However, if the server 106 determines that the aggregate of the first and second confidence scores is less than the retrieved second threshold value, the server 106 controls the movements of the eleventh to sixteenth objects 314-324 that are yet to be selected. In an example, when the aggregate of the first and second confidence scores is less than the retrieved second threshold value, the eleventh through sixteenth objects 314-324 follow a defined path, which may be different from the random path. In one example, the defined path is same as the path followed by unselected objects (such as the objects 216-226 as shown in FIG. 2D) in the training phase.

With reference to FIG. 3E, the fourth UI screen 304b displays a pattern formed by the user 102 by connecting the objects 310-324 sequentially. After selecting the tenth object 312, the user 102 connects the tenth object 312 to any of the eleventh through sixteenth objects 314-324 (for example, the eleventh object 314) and continues to select the remaining objects sequentially. With each selection that the user 102 makes, the selected object becomes static with respect to the X-Y plane and the remaining objects that are yet to be selected continue to move in random motion. The selection of the remaining objects continue until all the objects are selected. In one embodiment, the user 102 may be required to connect the last object that is selected (for example, the sixteenth object 324) to the ninth object 310 to form the pattern without deviating from the spirit of the invention. On selecting the last object, all the objects 310-324 become static with respect to the X-Y plane and the server 106 records and stores the formed pattern in the knowledgebase. In an example, the eleventh through sixteenth objects 314-324 are at positions $d_{11}$-$d_{16}$, respectively, whereas the ninth and tenth objects 310 and 312 are at positions $b_9$ and $c_{10}$, respectively, when the pattern is formed at an eighth time instant ($t_8$). The solid lines (as shown in FIG. 3E) indicate the selections performed by the user 102. Further, with the selections of the eleventh through sixteenth objects 314-324, the server 106 extracts associated data points and determines third through eighth confidence scores, respectively.

The server 106 then compares an aggregate of the first through eighth confidence scores (i.e., an aggregate score for the selection of the sixteenth object 324) with a retrieved eighth threshold value from the knowledgebase. Based on the comparison, the server 106 determines whether the aggregate of the first through eighth confidence scores is greater than or equal to the retrieved eighth threshold value. When the server 106 determines that the aggregate of the first through eighth confidence scores is greater than or equal to the retrieved eighth threshold value, the server 106 authenticates the user 102. The authentication is unsuccessful when the server 106 determines that the aggregate of the first through eighth confidence scores is less than the retrieved eighth threshold value. The server 106 further communicates a result of the authentication to the user 102. In an embodiment, the server 106 communicates the first notification to the user 102 to indicate that the authentication is successful. In another embodiment, the server 106 communicates the second notification to the user 102 to indicate that the authentication is unsuccessful. Further, the server 106 may request the user 102 to enter the username again. Thus, the server 106 authenticates the user 102 based on the subconscious choices that the user 102 makes when presented with the objects, such as the objects 310-324, in random motion. In other words, the thought process of the user 102 is used by the server 106 to uniquely identify and authenticate the user 102.

It will be apparent to a person skilled in the art that the first through eighth confidence scores are associated with the first through eighth selections made by the user 102. In a non-limiting example as shown in FIGS. 3C-3E, the first through eighth selections correspond to selections of the ninth through sixteenth objects 310-324, respectively. However, the user 102 may select the ninth through sixteenth objects 310-324 in any random order that is different from the selection order shown in FIGS. 3C-3E.

It will further be apparent to a person skilled in the art that the pattern shown in FIG. 3E is one pattern formed by the user 102 when presented with the objects 310-324 in random motion. The user 102 may form different patterns, apart from the pattern shown in FIG. 3E. The authentication of the user 102 is independent of the pattern formed by the user 102 but depends on the subconscious choices made (i.e., selections of the objects) by the user 102 when presented with the objects 310-324.

Figure 4A:
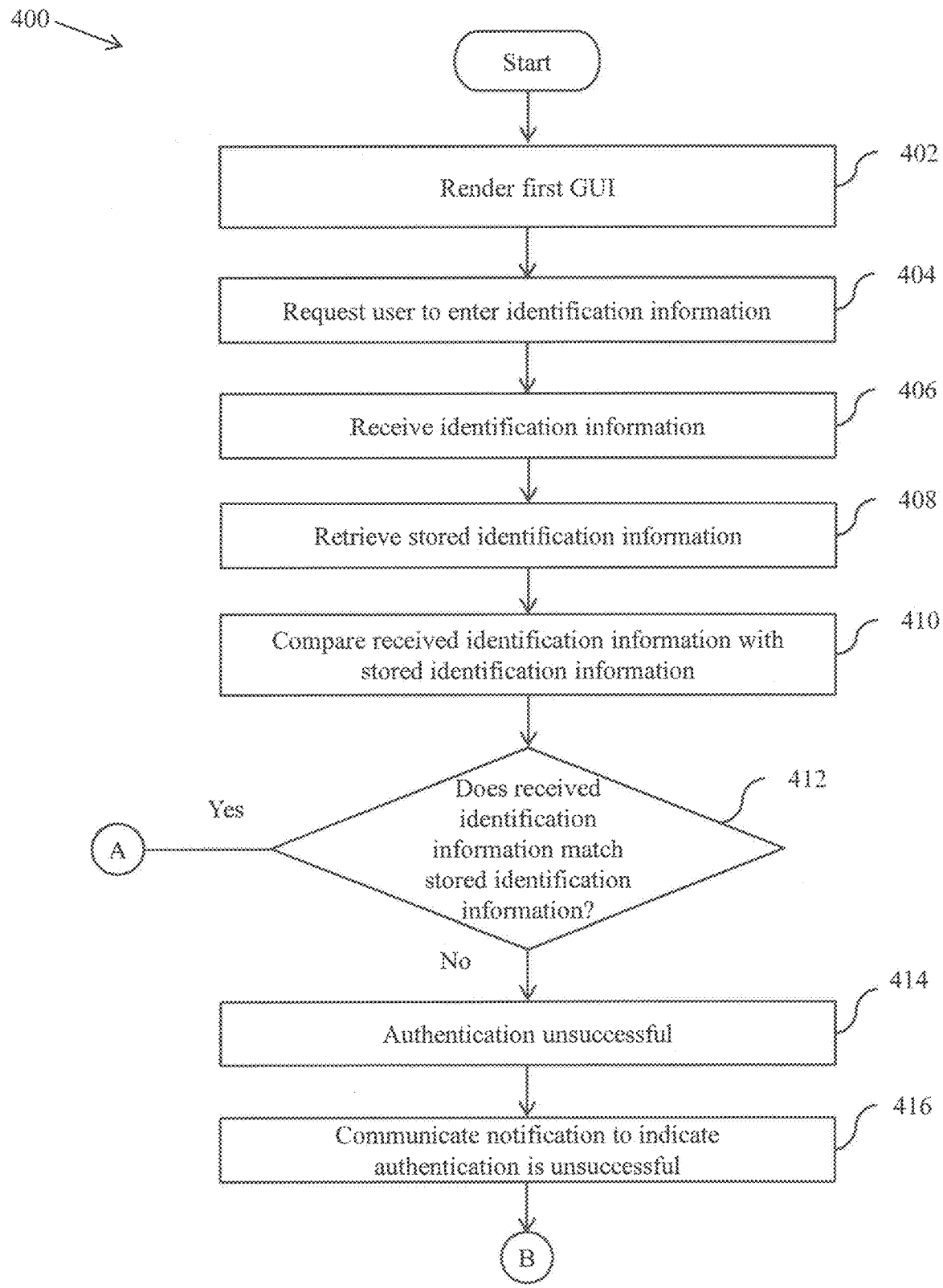
FIGS. 4A-4C collectively represent a flow chart that illustrates a method for executing the training phase, in accordance with an embodiment of the present invention.
Figure 4B:
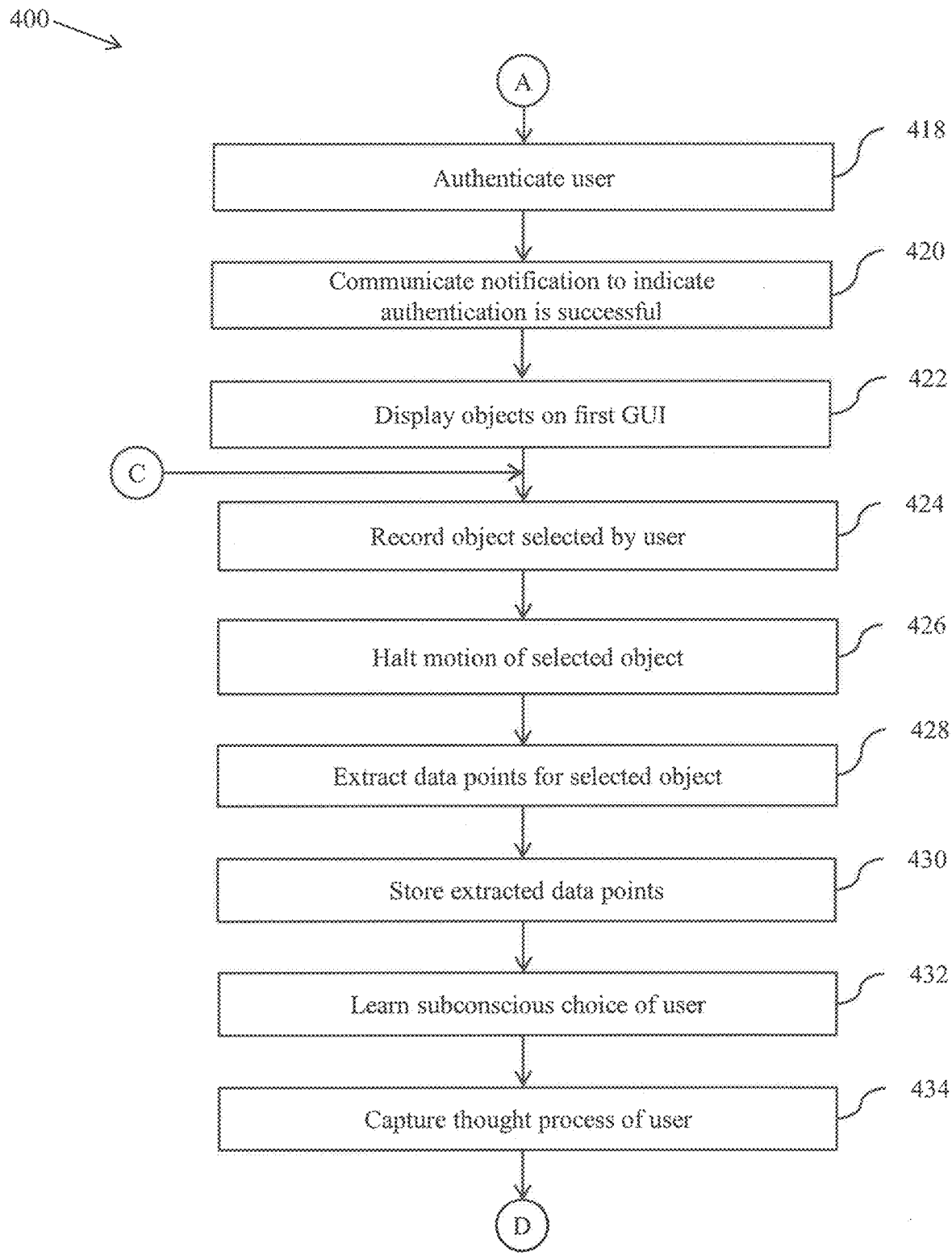
Figure 4C:
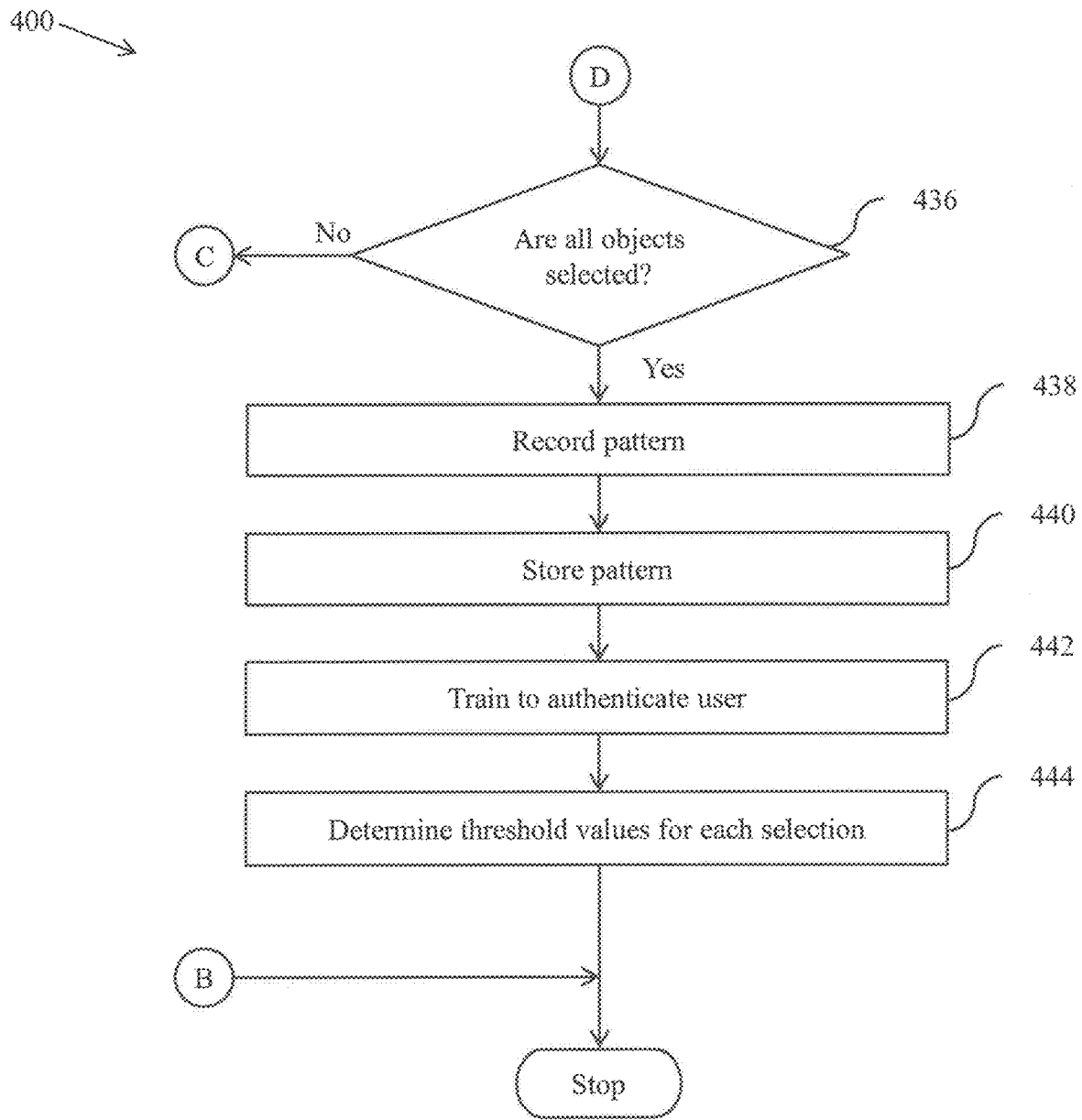
Figure 5A:
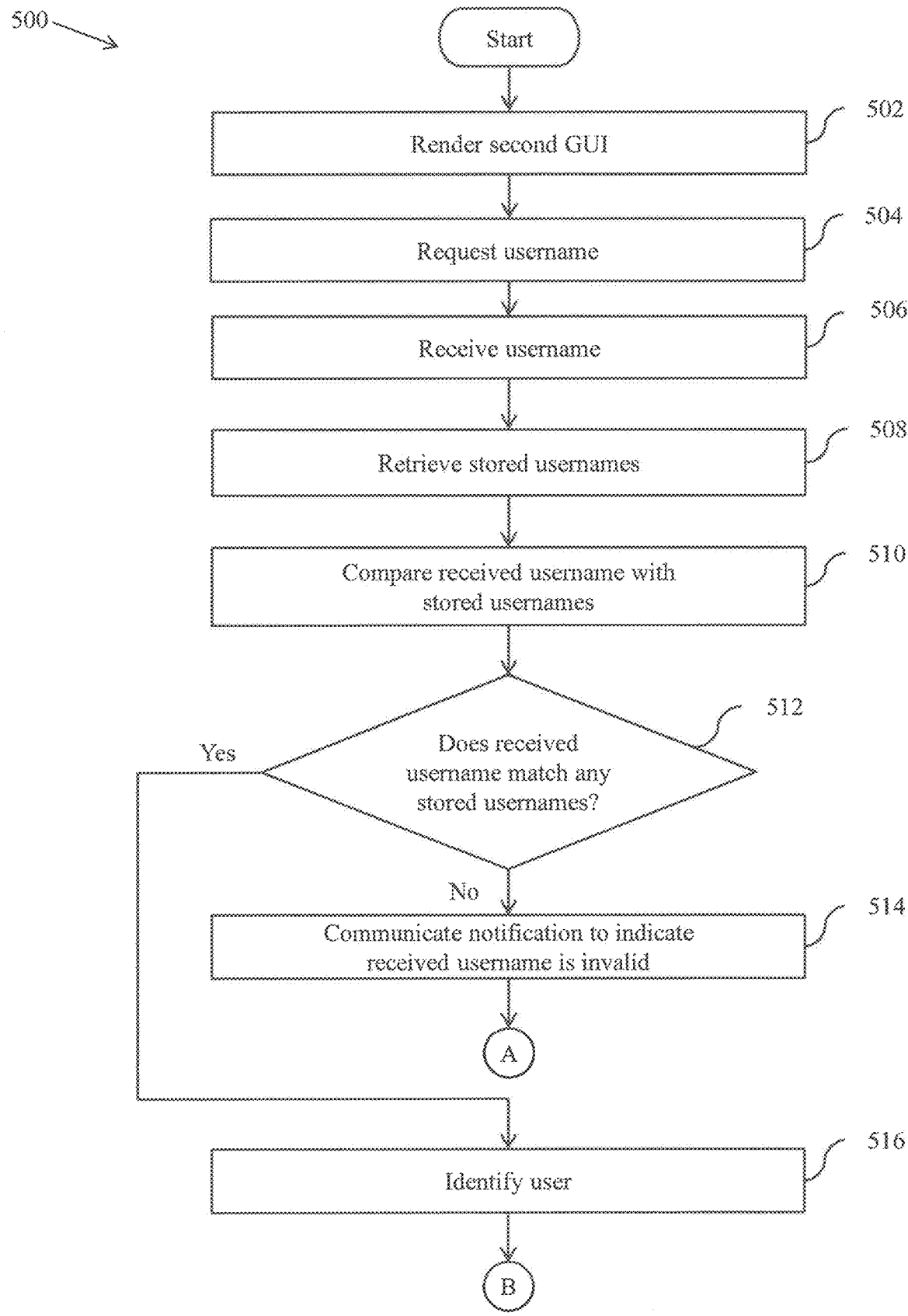
FIGS. 5A-5D collectively represent a flow chart that illustrates a method for executing the implementation phase to authenticate the users, in accordance with an embodiment of the present invention.
Figure 5B:
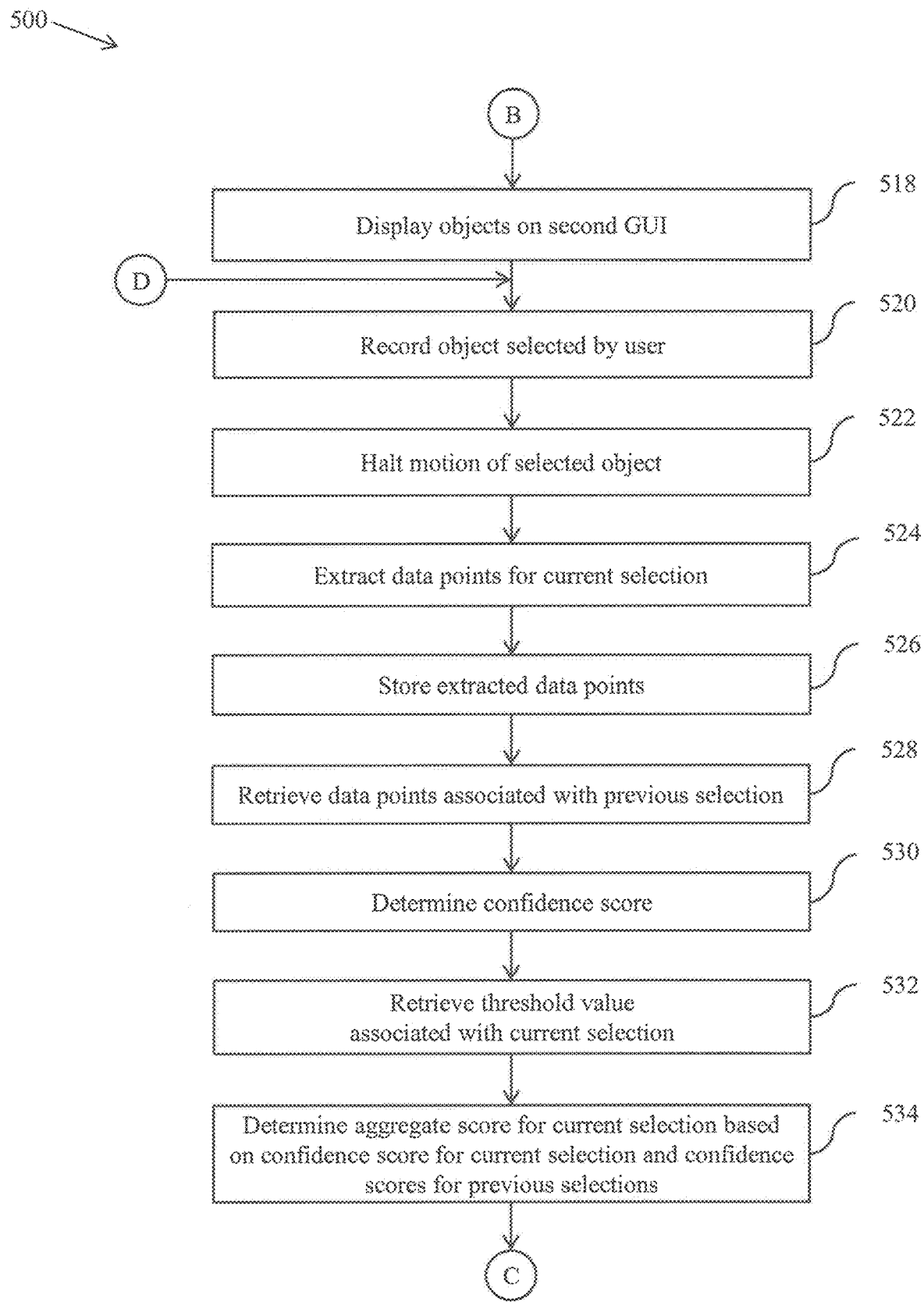
Figure 5C:
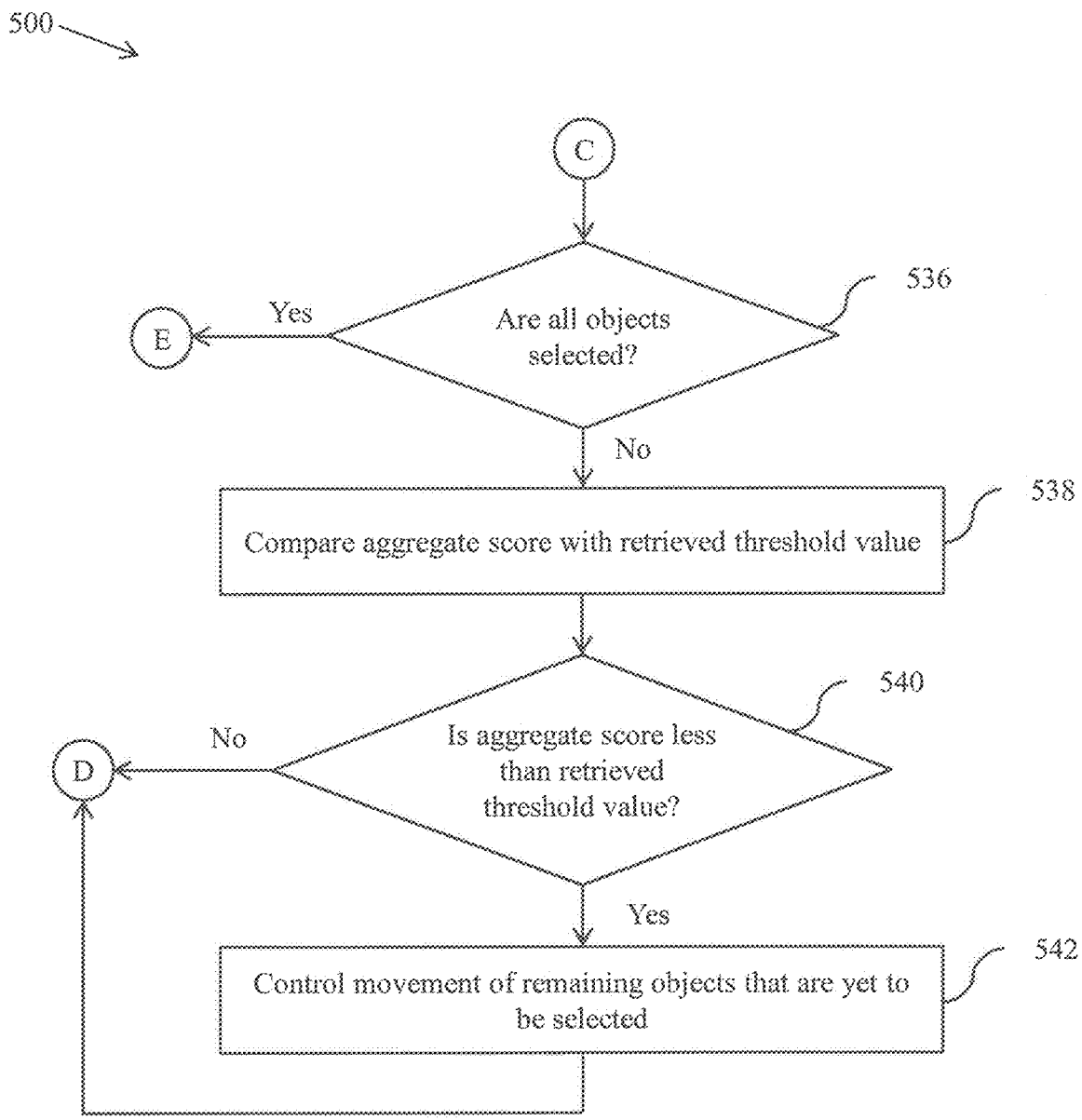
Figure 5D:
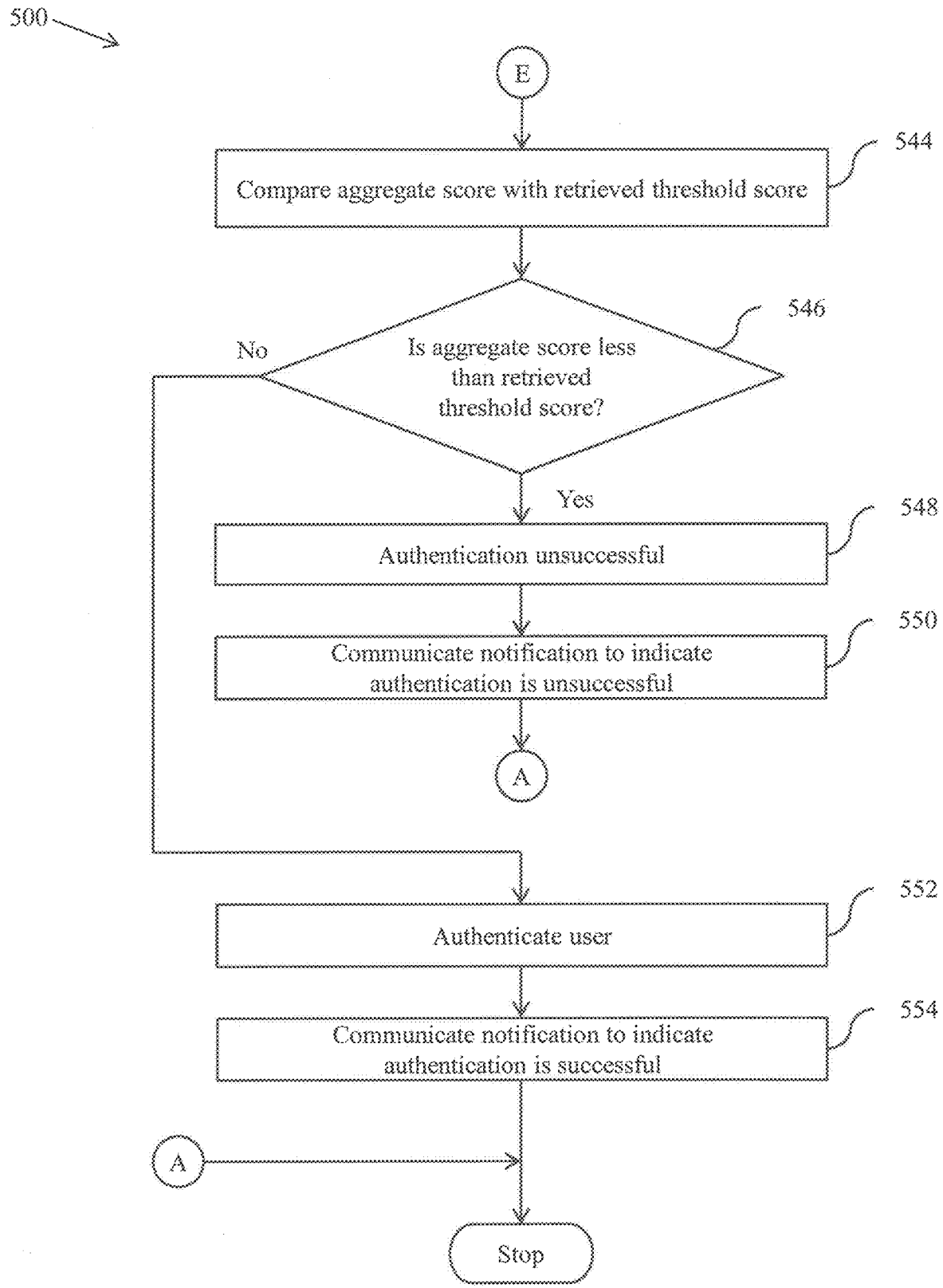

FIGS. 4A-4C collectively represent a flow chart 400 that illustrates a method for executing the training phase, in accordance with an embodiment of the present invention. As a part of the sign up, the user 102 provides her username and password to the server 106 as the authentication information. Once the sign up is successful and the user profile of the user 102 is created, the server 106 executes the training phase. At step 402, the server 106 renders the first GUI 202 that displays the first UI screen 204a on the computing device 104. At step 404, the server 106 requests the user 102 to enter her authentication information. At step 406, the server 106 receives the authentication information from the user 102 by way of the computing device 104. At step 408, the server 106 retrieves the stored authentication information of the user 102 from at least one of its memory, its knowledgebase, the external database, or an external memory. At step 410, the server 106 compares the received authentication information with the stored authentication information of the user 102.

At step 412, the server 106 determines whether the received authentication information matches the stored authentication information. If at step 412, the server 106 determines that there is a mismatch between the received authentication information and the stored authentication information, step 414 is performed. At step 414, the server 106 determines that the authentication is unsuccessful and does not authenticate the user 102. At step 416, the server 106 communicates the second notification to the user 102 to indicate that the authentication is unsuccessful. The server 106 may further request the user 102 to enter the authentication information again. If at step 412, the server 106 determines that the received authentication information matches the stored authentication information, step 418 is performed. At step 418, the server 106 authenticates the user 102. At step 420, the server 106 communicates the first notification to the user 102 to indicate that the authentication is successful.

At step 422, the server 106 displays objects, such as the objects 212-226 shown in FIG. 2B, on the first GUI 202 by way of the second UI screen 204b. The objects move in random motion in the X and Y axis on the second UI screen 204b and are spaced apart from each other. The server 106 further prompts the user 102 to select the objects sequentially. The user 102 thus selects an object, such as the first object 212. At step 424, the server 106 records the object selected by the user 102. At step 426, the server 106 halts the motion of the selected object, i.e., the first object 212 becomes static with respect to the plane it is displayed on. The remaining objects that are yet to be selected, i.e., the second through eighth objects 214-226 continue to move in random motion.

At step 428, the server 106 extracts data points associated with the selection of the object that are based on the set of factors. The set of factors include a movement trajectory, i.e., a path traced by the user 102 to connect a previously selected object to the selected object, positions of the remaining objects that are yet to be selected with respect to the selected object, speeds of the remaining objects that are yet to be selected, and a time duration for selecting the object. The time duration for selecting the object includes a time duration for the previous selection and a time duration between the previous and current selections. It will be apparent to a person skilled in the art that when the user 102 makes an initial selection of an object, such as the selection of the first object 212, the data points based on the movement trajectory and the time duration for selecting the object indicates a null value, as it is the initial selection. However, for subsequent selections of the objects, such as the selections of the second through eighth objects 214-226, the data points based on the movement trajectory and the time duration for selecting the object may indicate a non-zero value.

At step 430, the server 106 stores the extracted data points in its knowledgebase. At step 432, the server 106 trains itself to learn the subconscious choices of the user 102 that is based on the extracted data points and the current selection. At step 434, the server 106 captures the thought process of the user 102 based on the extracted data points and the subconscious choices of the user 102 for selecting the object instead of selecting any one of the remaining objects. At step 436, the server 106 checks if all the objects are selected by the user 102. If at step 436, the server 106 determines that all the objects are not selected, step 424 is performed. However, if at step 436, the server 106 determines that all the objects are selected, step 438 is performed. At step 438, the server 106 records a pattern formed by the user 102 when the user 102 sequentially selects all the objects. At step 440, the server 106 stores the pattern in its knowledgebase. The pattern formed by the user 102 indicates the subconscious choices made by the user 102. At step 442, the server 106 trains itself to authenticate the user 102 based on the subconscious choices made by the user 102. At step 444, the server 106 determines threshold values for each selection based on the training. The determined threshold values for each selection is used by the server 106 during the implementation phase for authenticating the user 102.

The server 106 executes multiple such training cycles over the period of time and records multiple data points and patterns (i.e., the test data of the user 102). The server 106 uses one or more AI techniques known in the art (such as, fuzzy logic, SVM, HMMs, greedy search algorithms, rule-based systems, Bayesian models, neural networks, decision tree learning methods, other non-linear training techniques, data fusion, utility-based analytical systems, or the like) to train itself to authenticate the user 102 based on the test data to achieve a desired accuracy in authenticating the user 102. Further, the server 106 determines the threshold values for each selection, for each training cycle. The server 106 then determines final threshold values for each selection based on all the threshold values for each selection determined during the training phase.

FIGS. 5A-5D collectively represent a flow chart 500 that illustrates a method for executing the implementation phase to authenticate the users, in accordance with an embodiment of the present invention. When the user 102 accesses the application to sign-in to her financial account, the server 106 executes the implementation phase. At the step 502, the server 106 renders the second GUI 302 that displays the third UI screen 304a on the computing device 104. At step 504, the server 106 requests the user 102 to enter her username. The user 102 uses the computing device 104 to enter her username. At step 506, the server 106 receives the username from the user 102 by way of the computing device 104. At step 508, the server 106 retrieves stored usernames from at least one of its memory, its knowledgebase, the external database, or an external memory. At step 510, the server 106 compares the received username with the stored usernames. At step 512, the server 106 determines whether the received username matches any one of the stored usernames. If at step 512, the server 106 determines that the received username does not match any of the stored usernames, step 514 is performed. At step 514, the server 106 communicates the third notification to the user 102 to indicate that the received username is invalid. The server 106 may request the user 102 to enter the username again. If at step 512, the server 106 determines that the received username matches one of the stored usernames, step 516 is performed. At step 516, the server 106 identifies the user 102 based on the username provided by the user 102.

At step 518, the server 106 displays objects, such as the objects 310-324 shown in FIG. 3B, on the second GUI 302 by way of the fourth UI screen 304b. The objects move in random motion in the X and Y axes on the fourth UI screen 304b and are spaced apart from each other. The server 106 prompts the user 102 to select the objects sequentially. The user 102 thus selects an object, such as the ninth object 310. At step 520, the server 106 records the object selected by the user 102. At step 522, the server 106 halts the motion of the selected object, i.e., the ninth object 310 becomes static with respect to the plane it is displayed on. Further the remaining objects that are yet to be selected, i.e., the tenth through sixteenth objects 312-324, continue to move in random motion.

At step 524, the server 106 extracts data points associated with the selected object that are based on the set of factors that include a movement trajectory, i.e., a path traced by the user 102 to connect a previously selected object to the selected object, positions of the remaining objects that are yet to be selected with respect to the selected object, speeds of the remaining objects that are yet to be selected, and a time duration for selecting the object. The time duration for selecting the object includes a time duration for the previous selection and a time duration between the previous and current selections. It will be apparent to a person skilled in the art that when the user 102 makes an initial selection of an object, such as the selection of the ninth object 310, the data points based on the movement trajectory and the time duration for selecting the object indicates a null value, as it is the initial selection. However, for subsequent selections of the objects, such as the selections of the tenth through sixteenth objects 312-324, the data points based on the movement trajectory and the time duration for selecting the object may indicate a non-zero value. At step 526, the server 106 stores the extracted data points in its knowledgebase.

At step 528, the server 106 retrieves from its knowledgebase, the data points associated with the previous selection. The retrieved data points include positions of the selected object and the remaining objects that are yet to be selected with respect to the previously selected object at a time instant of the previous selection, and speed of the selected objects and the remaining objects that are yet to be selected at the time instant of the previous selection. At step 530, the server 106 determines a confidence score for the current selection. The server 106 determines the confidence score based on the retrieved data points associated with the previous selection, the path traced by the user 102 to connect the previously selected object to the selected object, and the time duration for selecting the object. It will be apparent to a person skilled in the art that for the initial selection, the previous selection is not applicable. Hence, while determining the confidence score for the initial selection, the retrieved data points associated with the previous selection indicate a null value. Thus, the confidence score for the initial selection is not based on the previous selection. In an example, the confidence score for the initial selection is zero.

At step 532, the server 106 retrieves a threshold value associated with the current selection, from its knowledgebase. At step 534, the server 106 determines an aggregate score for the current selection. The aggregate score is an aggregate of the confidence score for the current selection and confidence scores for all previous selections. For the initial selection, there are no previous selections. Hence, for the initial selection, the aggregate score is equal to the confidence score for the initial selection, i.e., zero.

At step 536, the server 106 determines whether all the objects are selected by the user 102. At step 536, if the server 106 determines that all the objects are not selected, step 538 is performed. At step 538, the server 106 compares the aggregate score for the current selection with the retrieved threshold value for the current selection. At step 540, the server 106 determines whether the aggregate score is less than the retrieved threshold value. At step 540, if the server 106 determines that the aggregate score is less than the retrieved threshold value, step 542 is performed. At step 542, the server 106 controls the movement of the remaining objects that are yet to be selected in a manner such that subsequent selections performed by the user 102 assists the server 106 in authenticating the user 102. At step 540, if the server 106 determines that the aggregate score is not less than (i.e., greater than or equal to) the retrieved threshold value, step 520 is performed.

At step 536, if the server 106 determines that all the objects are selected, step 544 is performed. At step 544, the server 106 compares the aggregate score for the current selection with the retrieved threshold value for the current selection. At step 546, the server 106 determines whether the aggregate score is less than the retrieved threshold value. At step 546, if the server 106 determines that the aggregate score is less than the retrieved threshold value, step 548 is performed. At step 548, the server 106 determines that the authentication is unsuccessful and does not authenticate the user 102. At step 550, the server 106 communicates the second notification to the user 102 to indicate that the authentication is unsuccessful. The server 106 may further request the user 102 to enter the username again. At step 546, if the server 106 determines that the aggregate score is not less than (i.e., greater than or equal to) the retrieved threshold value, step 552 is performed. At step 552, the server 106 authenticates the user 102. At step 554, the server 106 communicates the first notification to the user 102 to indicate that the authentication is successful.

Figure 6:
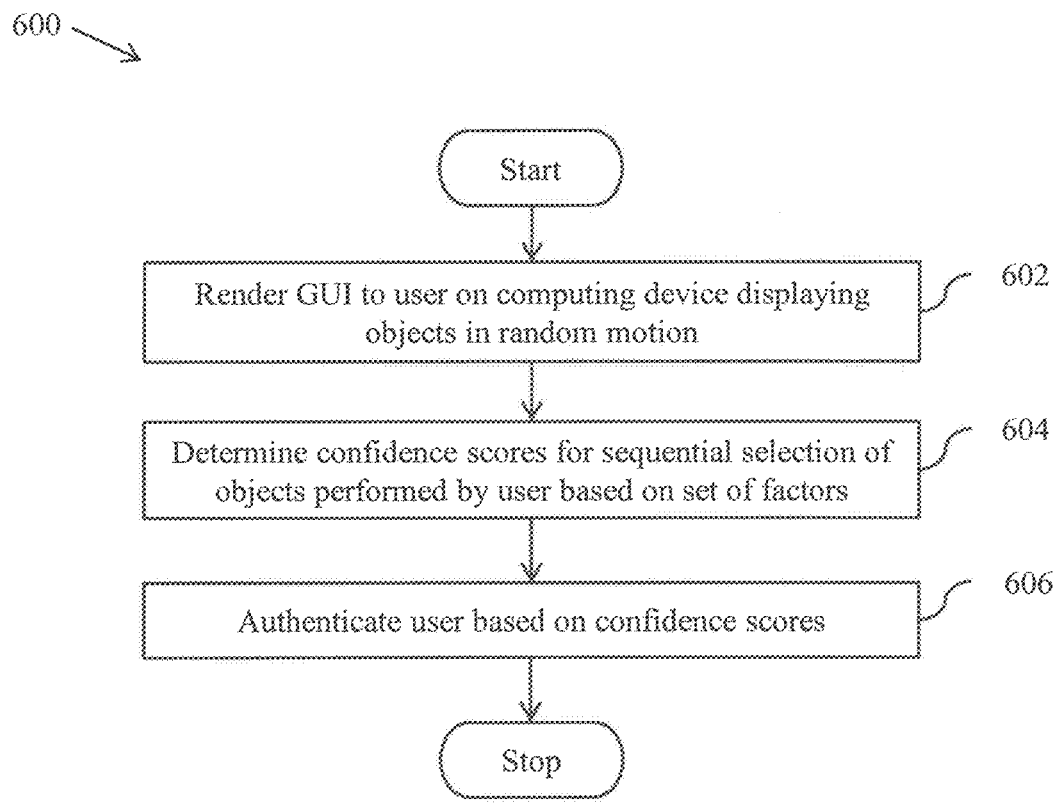
FIG. 6 represents a high-level flow chart that illustrates a method for authenticating the users, in accordance with an embodiment of the present invention.

FIG. 6 represents a high-level flow chart 600 that illustrates a method for authenticating the users, in accordance with an embodiment of the present invention. When the user 102 accesses the application to sign-in to her financial account, the server 106 requests the user 102 to enter her username. The user 102 then provides her username to the server 106 by way of the computing device 104. At step 602, the server 106 renders the GUI (such as the second GUI 302 shown in FIGS. 3A-3E) to the user 102 on the computing device 104. The GUI displays the objects (such as the objects 310-324 shown in FIG. 3B) in random motion. At step 604, the server 106 determines confidence scores for the sequential selection of the objects performed by the user 102, based on the set of factors. A confidence score corresponds to a selection of an object. At step 606, the server 106 authenticates the user 102 based on the confidence scores. The aforementioned method for authenticating the user 102 may be implemented in a financial domain. For example, the server 106 may receive a transaction request for a transaction initiated by the user 102 from the computing device 104. The server 106 performs the authentication of the user 102 in a manner as described above, and processes the transaction, when the user 102 is authenticated.

Figure 7:
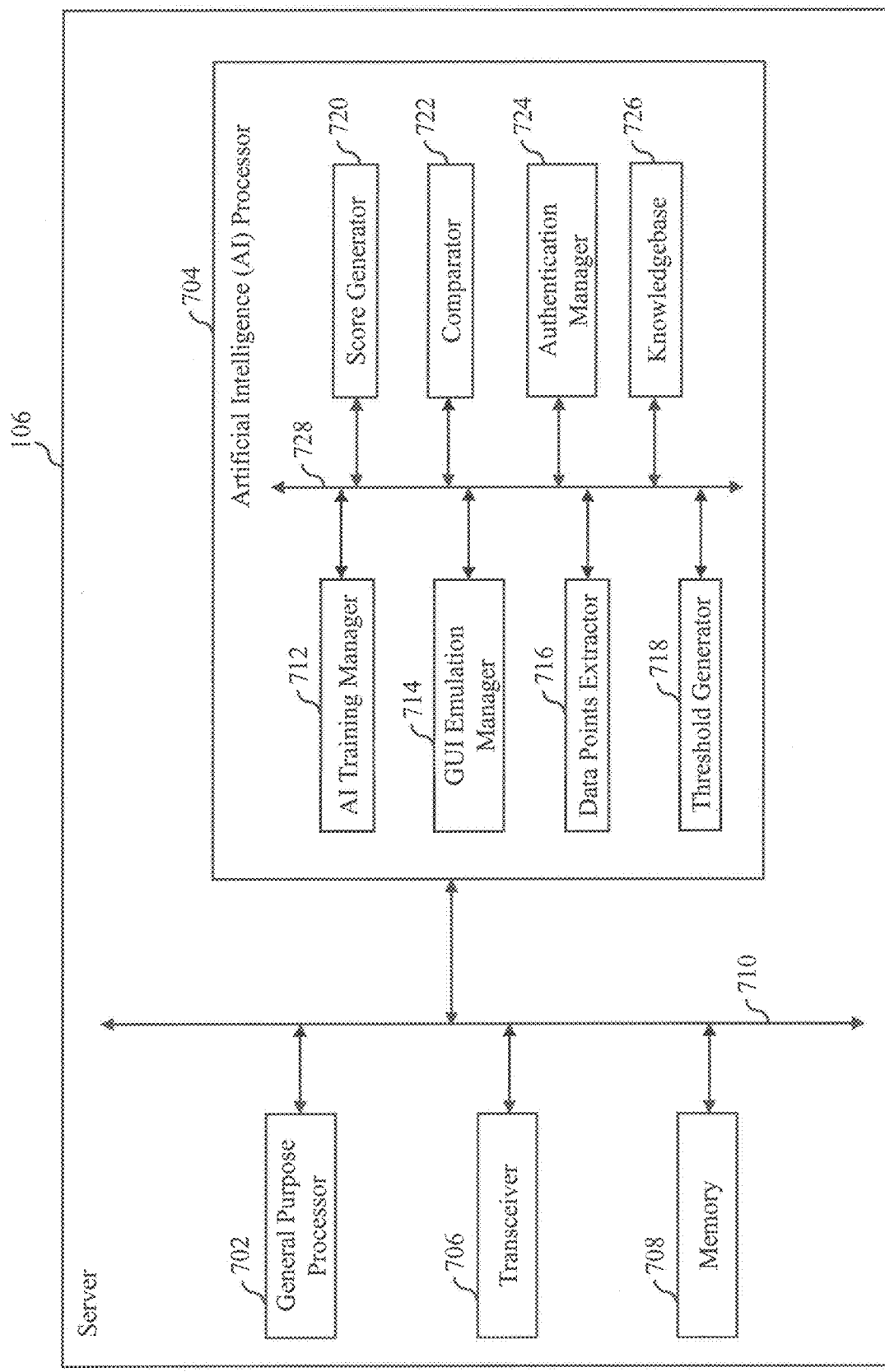
FIG. 7 is a block diagram that illustrates various components of the server, in accordance with an embodiment of the present invention.

FIG. 7 is a block diagram that illustrates various components of the server 106, in accordance with an embodiment of the present invention. The server 106 includes circuitry, such as a general-purpose processor (GPP) 702, an AI processor 704, a transceiver 706, and a memory 708 that communicate with each other by way of a first communication bus 710. The AI processor 704 includes an AI training manager 712, a GUI emulation manager 714, a data points extractor 716, a threshold generator 718, a score generator 720, a comparator 722, an authentication manager 724, and a knowledgebase 726 that communicate with each other by way of a second communication bus 728. Examples of the first and second communication buses 710 and 728 include, but are not limited to, an industry standard architecture (ISA) bus, an extended industry standard architecture (EISA) bus, a micro channel architecture (MCA) bus, a peripheral component interconnect (PCI) bus, a scalable coherent interface (SCI) bus, or any combination thereof.

The GPP 702 includes suitable logic, circuitry, and/or interfaces that are operable to execute one or more instructions stored in the memory 708 to perform one or more operations. During the training phase, the GPP 702 receives the authentication information, such as the username and the password of the user 102, from the computing device 104 by way of the transceiver 706. The GPP 702 further retrieves the authentication information of the user 102 that is stored in the memory 708 or in the knowledgebase 726 and compares the received authentication information with the retrieved authentication information, to authenticate the user 102. Similarly, during the implementation phase, the GPP 702 receives the username, from the computing device 104 by way of the transceiver 706. The GPP 702 further retrieves the usernames that are stored in the memory 708 or in the knowledgebase 726, and compares the received username with the stored usernames, to identify the user 102. The GPP 702 may further communicate a result of the authentication such as the first through third notifications to the computing device 104 by way of the transceiver 706. Examples of the GPP 702 include, but are not limited to, an application-specific integrated circuit (ASIC) processor, a reduced instruction set computing (RISC) processor, a complex instruction set computing (CISC) processor, or a field-programmable gate array (FPGA) processor. It will be apparent to a person skilled in the art that the GPP 702 is compatible with multiple operating systems.

The AI processor 704 includes suitable logic, circuitry, and/or interfaces to perform one or more operations, such as authentication of the user 102. The AI processor 704 executes a training phase to learn the process of authentication of users, such as the user 102, and implements the learning for performing the authentication of the users in the implementation phase. The training and implementation phases are executed using the AI techniques. The AI processor 704 presents objects (such as the objects 212-226 shown in FIGS. 2B-2E) in random motion and records the test data of the user 102 in the training phase as described in FIGS. 2B-2E. The AI processor 704 extracts data points associated with each selection that the user 102 performs and learns the process of authentication based on the extracted data points. During the implementation phase, the AI processor 704 authenticates the user 102 based on the selection of the objects as described in FIGS. 3A-3E. The functioning of the AI processor 704 is explained herein by way of its various components.

The AI training manager 712 includes suitable logic, circuitry, and/or interfaces that are operable to execute one or more instructions stored in the knowledgebase 726 to perform one or more operations. The AI training manager 712 initiates the training of the AI processor 704 to learn preferences of the users, such as the user 102, that are based on their subconscious choices. During the training phase, when the user 102 sequentially selects the objects (such as the objects 212-226), the AI training manager 712 extracts the data points associated with each selection that the user 102 performs and learns the preferences of the user 102 based on the extracted data points. The AI training manager 712 further captures the thought process of the user 102 based on selections performed by the user 102. The selection of the objects indicates subconscious choices made by the user 102. The training phase continues until the AI processor 704 reaches an acceptable level of accuracy in authenticating the user 102.

The GUI emulation manager 714 includes suitable logic, circuitry, and/or interfaces that are operable to execute one or more instructions stored in the knowledgebase 726 to perform one or more operations. The GUI emulation manager 714 renders the GUI, such as the first and second GUIs 202 and 302, on the computing device 104 in both the training and the implementation phase, respectively, for displaying objects that move in random motion. The GUI emulation manager 714 further determines the shape of the objects. When the user 102 selects the objects, the GUI emulation manager 714 halts the movement of the selected objects whereas the remaining objects that are yet to be selected continue to move in random motion. Further, when the user 102 sequentially selects the objects, the GUI emulation manager 714 records the pattern formed by the user 102 in the knowledgebase 726. The GUI emulation manager 714 thus records various patterns formed by the user 102 in the training phase, and further records the pattern formed by the user 102 during the implementation phase. The GUI emulation manager 714 further controls movement of the objects that are yet to be selected in the implementation phase based on the comparison of threshold values performed by the comparator 722.

The data points extractor 716 includes suitable logic, circuitry, and/or interfaces that are operable to execute one or more instructions stored in the knowledgebase 726 to perform one or more operations. For example, when the user 102 sequentially selects the objects (such as the objects 212-226 and the objects 310-324 during the training and implementation phases, respectively), the data points extractor 716 extracts data points associated with each selection that are based on the set of factors. The data points extractor 716 further determines the set of factors associated with each selection. The data points extractor 716 stores the extracted data points associated with each selection in the knowledgebase 726.

The threshold generator 718 includes suitable logic, circuitry, and/or interfaces that are operable to execute one or more instructions stored in the knowledgebase 726 to perform one or more operations. For example, the threshold generator 718 determines threshold values for selection of each object, during the training phase. The threshold generator 718 stores the threshold values in the knowledgebase 726.

The score generator 720 includes suitable logic, circuitry, and/or interfaces that are operable to execute one or more instructions stored in the knowledgebase 726 to perform one or more operations. For example, the score generator 720 determines confidence scores, when the user 102 selects the objects in random motion (such as the objects 310-324). The score generator 720 determines the confidence score for the current selection based on the training of the server 106, the data points associated with the previous selection that are retrieved from the knowledgebase 726, and the data points associated with the current selection that are extracted by the data points extractor 716. The score generator 720 may further determine an aggregate score for the current selection based on an aggregate of the confidence score for the current selection and confidence scores of all the previous selections.

The comparator 722 includes suitable logic, circuitry, and/or interfaces that are operable to execute one or more instructions stored in the knowledgebase 726 to perform one or more operations. The comparator 722 retrieves from the knowledgebase 726, a threshold value for a current selection and compares the aggregate score determined by the score generator 720 with the retrieved threshold value. If the selection corresponds to a final selection, the result of the comparison is used by the authentication manager 724. If the selection does not correspond to the final selection, the result of the comparison is used by the GUI emulation manager 714 to control the movement of the objects that are yet to be selected.

The authentication manager 724 includes suitable logic, circuitry, and/or interfaces that are operable to execute one or more instructions stored in the knowledgebase 726 to perform one or more operations. For example, the authentication manager 724 authenticates the user 102 based on the result of the comparison performed by the comparator 722. For example, the authentication manager 724 identifies that the user 102 is a valid user, when the result is true, i.e., the aggregate score for the final selection is greater than or equal to the retrieved threshold value for the final selection. The authentication manager 724 communicates the first notification to the computing device 104 by way of the transceiver 706. The authentication manager 724 identifies that the user 102 is not a valid user, when the result is false, i.e., the aggregate score for the final selection is less than the retrieved threshold value for the final selection. The authentication manager 724 further communicates the second notification to the computing device 104 by way of the transceiver 706. In an alternate embodiment, the authentication manager 724 may perform the functions of the comparator 722.

The knowledgebase 726 includes suitable logic, circuitry, and/or interfaces to store the one or more instructions that are executed by the AI training manager 712, the GUI emulation manager 714, the data points extractor 716, the threshold generator 718, the score generator 720, the comparator 722, and the authentication manager 724, to perform the one or more operations. The knowledgebase 726 may store the test data of the user 102. The knowledgebase 726 may further store the data points extracted by the data points extractor 716, and the threshold values determined by the threshold generator 718. The knowledgebase 726 further stores the patterns recorded by the GUI emulation manager 714. The knowledgebase 726 may further store the authentication information of the user 102, the usernames of individuals (users) that the AI processor 704 is trained to authenticate, and the result of the authentication.

The transceiver 706 includes suitable logic, circuitry, and/or interfaces that are operable to transmit (or receive) data to (or from) various devices, such as the computing device 104 over the communication network 108. For example, the transceiver 706 receives the authentication information and the username during the training and implementation phases, respectively, from the computing device 104 over the communication network 108. The transceiver 706 communicates the result of the authentication to the computing device 104 over the communication network 108. Examples of the transceiver 706 include, but are not limited to, an antenna, a radio frequency transceiver, a wireless transceiver, and a Bluetooth transceiver. The transceiver 706 communicates with the communication network 108, the GPP 702, and the computing device 104 using various wired and wireless communication protocols, such as TCP/IP, UDP, 2G, 3G, 4G, and 5G communication protocols, LTE communication protocols, or any combination thereof.

The memory 708 includes suitable logic, circuitry, and/or interfaces to store the one or more instructions that are executed by the GPP 702 for performing the one or more operations. The memory 708 stores the authentication information of the user 102, the usernames of individuals (users) that the AI processor 704 is trained to authenticate, and the result of the authentication. Examples of the memory 708 include a RAM, a ROM, a removable storage drive, a HDD, a flash memory, a solid-state memory, and the like. It will be apparent to a person skilled in the art that the scope of the invention is not limited to realizing the memory 708 in the server 106, as described herein. In another embodiment, the memory 708 may be realized in form of a database server or a cloud storage working in conjunction with the server 106, without departing from the scope of the invention.

It will be apparent to a person skilled in the art that the scope of the invention is not limited to realizing the GPP 702 and the AI processor 704 as separate entities. In various other embodiments, the functionalities of the GPP 702 can be integrated into the AI processor 704, without departing from the scope of the invention. It will also be apparent to a person skilled in the art that the scope of the invention is not limited to realizing the server 106 that includes the GPP 702 and the AI processor 704. In various other embodiments, there may be two separate servers performing the functionalities of the GPP 702 and the AI processor 704, respectively, without departing from the scope of the invention.

Figure 8:
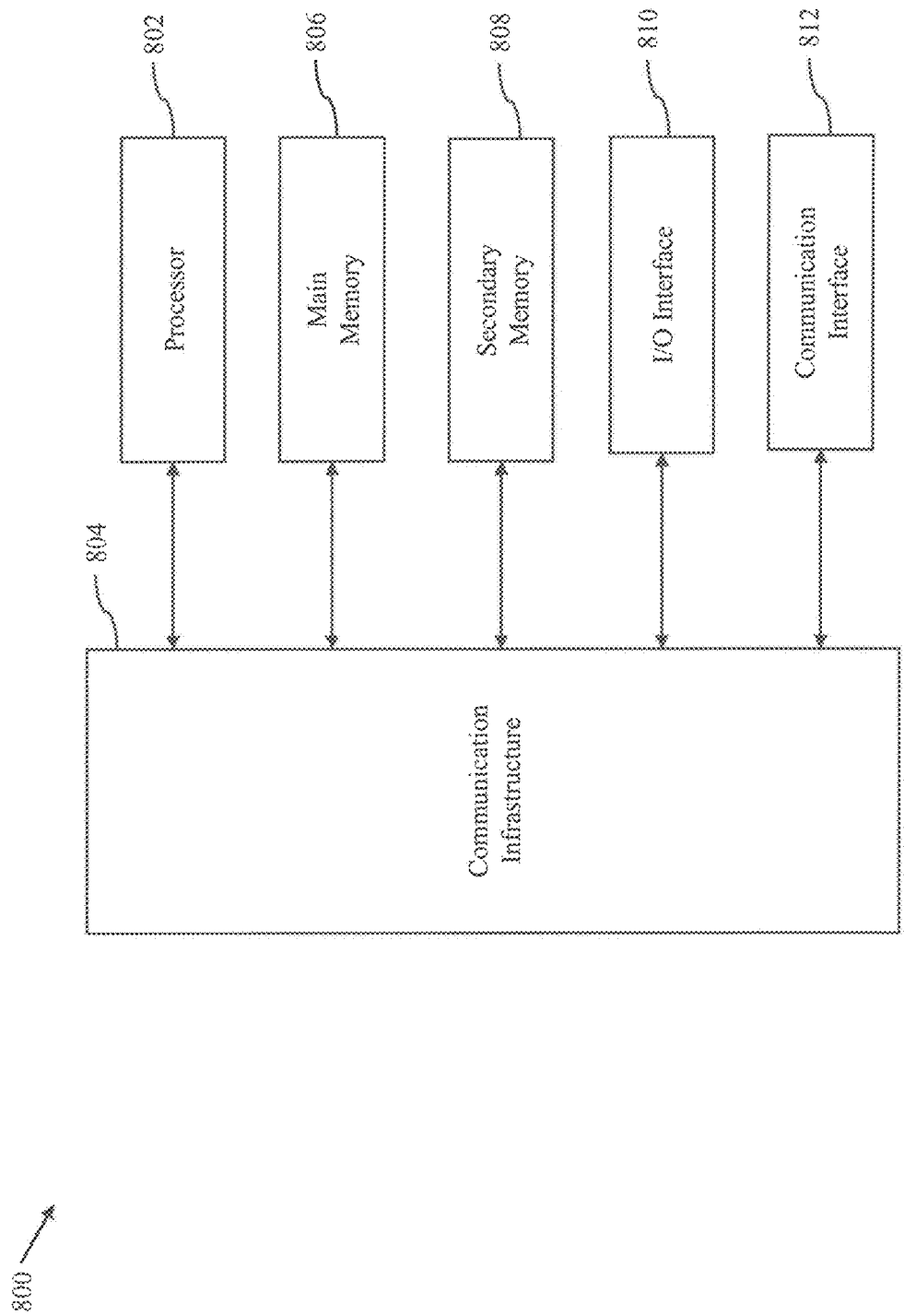
FIG. 8 is a block diagram that illustrates system architecture of a computer system, in accordance with an embodiment of the present invention.

FIG. 8 is a block diagram that illustrates system architecture of a computer system 800, in accordance with an embodiment of the present invention. An embodiment of present invention, or portions thereof, may be implemented as computer readable code on the computer system 800. In one example, the computing device 104 and the server 106 of FIG. 1 may be implemented in the computer system 800 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4A-4C, 5A-5D, and 6.

The computer system 800 includes a processor 802 that may be a special-purpose or a general-purpose processing device. The processor 802 may be a single processor, multiple processors, or combinations thereof. The processor 802 may have one or more processor cores. In one example, the processor 802 is an octa-core processor. Further, the processor 802 may be connected to a communication infrastructure 804, such as a bus, message queue, multi-core message-passing scheme, and the like. The computer system 800 may further include a main memory 806 and a secondary memory 808. Examples of the main memory 806 may include RAM, ROM, and the like. In one embodiment, the main memory 806 is the memory 708. The secondary memory 808 may include a hard disk drive or a removable storage drive, such as a floppy disk drive, a magnetic tape drive, a compact disk, an optical disk drive, a flash memory, and the like. Further, the removable storage drive may read from and/or write to a removable storage device in a manner known in the art. In one example, if the removable storage drive is a compact disk drive, the removable storage device may be a compact disk. In an embodiment, the removable storage unit may be a non-transitory computer readable recording media.

The computer system 800 further includes an input/output (I/O) interface 810 and a communication interface 812. The I/O interface 810 includes various input and output devices that are configured to communicate with the processor 802. Examples of the input devices may include a keyboard, a mouse, a joystick, a touchscreen, a microphone, and the like. Examples of the output devices may include a display screen, a speaker, headphones, and the like. The communication interface 812 may be configured to allow data to be transferred between the computer system 800 and various devices that are communicatively coupled to the computer system 800. Examples of the communication interface 812 may include a modem, a network interface, i.e., an Ethernet card, a communication port, and the like. Data transferred via the communication interface 812 may correspond to signals, such as electronic, electromagnetic, optical, or other signals as will be apparent to a person skilled in the art. The signals may travel via a communication channel (not shown) which may be configured to transmit the signals to devices that are communicatively coupled to the computer system 800. Examples of the communication channel may include, but are not limited to, cable, fiber optics, a phone line, a cellular phone link, a radio frequency link, and the like.

Computer program medium and computer usable medium may refer to memories, such as the main memory 806 and the secondary memory 808, which may be a semiconductor memory such as a DRAM. These computer program mediums may provide data that enables the computer system 800 to implement the methods illustrated in FIGS. 4A-4C, 5A-5D, and 6. In an embodiment, the present invention is implemented using a computer implemented application, the computer implemented application may be stored in a computer program product and loaded into the computer system 800 using the removable storage drive or the hard disk drive in the secondary memory 808, the I/O interface 810, or the communication interface 812.

A person having ordinary skill in the art will appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded in virtually any device. For instance, at least one processor such as the processor 802 and a memory such as the main memory 806 and the secondary memory 808 implements the above described embodiments. Further, the operations may be described as a sequential process, however some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

The present invention authenticates the user 102 by utilizing AI techniques to learn the subconscious choices of the user 102 and eventually capture the thought process of the user 102. The server 106 executes multiple training cycles over a period of time to capture the thought process of the user 102 based on the subconscious choices that the user 102 makes for selecting the objects. As the choices made by the user 102 are not constant and known only to the user 102, such choices are difficult to be tracked or leaked. Hence, authenticating the user 102 based on such choices increases the accuracy of identifying a valid user as compared to password-based authentication techniques. Further, there is no requirement for the user 102 to remember passwords or respond to any extra layer of security in the implementation phase. Thus, the inconvenience caused to the user 102 is significantly reduced as compared to the conventional user authentication methods. Further, due to the adaptive learning model adopted by the server 106, the chances of false positives are reduced. The present invention can be easily implemented in various environments such as access management, financial transactions, and the like. The present invention can further be easily coupled with the AI based user authentication methods that work on device signatures and geolocation data, without adding any complexity or causing inconvenience to the user 102.

Techniques consistent with the present invention provide, among other features, systems and methods for authenticating users. While various exemplary embodiments of the disclosed system and method have been described above it should be understood that they have been presented for purposes of example only, not limitations. It is not exhaustive and does not limit the invention to the precise form disclosed. Modifications and variations are possible in light of the above teachings or may be acquired from practicing of the invention, without departing from the breadth or scope.

In the claims, the words 'comprising', 'including' and 'having' do not exclude the presence of other elements or steps then those listed in a claim. The terms "a" or "an," as used herein, are defined as one or more than one. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

What is claimed is:

1. A method for user authentication, the method comprising:
    rendering, by a server to a user on a computing device, a graphical user interface that displays a plurality of objects in random motion;
    determining, by the server based on a set of factors, a plurality of confidence scores for a sequential selection of the plurality of objects performed by the user such that a confidence score of the plurality of confidence scores corresponds to a selection of an object of the plurality of objects;
    authenticating, by the server, the user based on the plurality of confidence scores; and
    changing, by the server, an existing way of movement of only objects that are yet to be selected, when an aggregate of one or more confidence scores corresponding to one or more objects that have been previously selected from the plurality of objects is less than a threshold value, wherein the movement of only the objects that are yet to be selected is changed in a predetermined way,
    wherein when the one or more objects are selected, the one or more objects become static.

2. The method of claim 1, further comprising:
    recording, by the server, over a period of time test data of the user; and
    training the server to authenticate the user based on the test data of the user.

3. The method of claim 2, wherein the test data of the user is associated with one or more sequential selections performed by the user over the period of time.

4. The method of claim 1, further comprising:
    extracting, by the server, based on the set of factors, data points associated with the sequential selection of the plurality of objects.

5. The method of claim 1, wherein the set of factors includes a path traced by the user to connect a previously selected object to the selected object.

6. The method of claim 1, wherein the set of factors includes positions of the selected object and remaining objects that are yet to be selected from the plurality of objects with respect to a previously selected object.

7. The method of claim 1, wherein the set of factors includes speeds of the selected object and remaining objects that are yet to be selected from the plurality of objects.

8. The method of claim 1, wherein the set of factors includes a time duration for selecting the object.

9. The method of claim 1, further comprising capturing, by the server, at least one of a thought process or subconscious choice of the user based on at least one of the set of factors.

10. A system for authenticating a user, the system comprising: a server, implemented at least partly in hardware, configured to:
    render, to the user on a computing device, a graphical user interface that displays a plurality of objects in random motion;
    determine, based on a set of factors, a plurality of confidence scores for a sequential selection of the plurality of objects performed by the user such that a confidence score of the plurality of confidence scores corresponds to a selection of an object of the plurality of objects;
    authenticate the user based on the plurality of confidence scores; and
    changing an existing way of movement of only objects that are yet to be selected, when an aggregate of one or more confidence scores corresponding to one or more objects that have been previously selected from the plurality of objects is less than a threshold value, wherein the movement of only the objects that are yet to be selected is changed in a predetermined way,
    wherein when the one or more objects are selected, the one or more objects become static.

11. The system of claim 10, wherein the server is further configured to:

record over a period of time test data of the user; and train to authenticate the user based on the test data of the user, wherein the test data of the user is associated with one or more sequential selections performed by the user over the period of time.

12. The system of claim 10, wherein the server is further configured to:
    extract, based on the set of factors, data points associated with the sequential selection of the plurality of objects.

13. The system of claim 10, wherein the set of factors includes a path traced by the user to connect a previously selected object to the selected object.

14. The system of claim 10, wherein the set of factors includes positions of the selected object and remaining objects that are yet to be selected from the plurality of objects with respect to a previously selected object.

15. The system of claim 10, wherein the set of factors includes speeds of the selected object and remaining objects that are yet to be selected from the plurality of objects.

16. The system of claim 10, wherein the set of factors includes a time duration for selecting the object.

17. The system of claim 10, wherein the server captures at least one of a thought process or subconscious choice of the user based on at least one of the set of factors.

18. A method for processing transactions, the method comprising:
    receiving, by a server from a computing device, a transaction request for a transaction initiated by a user;
    rendering, by the server to the user on the computing device, a graphical user interface that displays a plurality of objects in random motion based on the transaction request;
    determining, by the server based on a set of factors, a plurality of confidence scores for a sequential selection of the plurality of objects performed by the user such that a confidence score of the plurality of confidence scores corresponds to a selection of an object of the plurality of objects;
    authenticating, by the server, the user based on the plurality of confidence scores, wherein the transaction is processed when the user is authenticated; and
    changing, by the server, an existing way of movement of only objects that are yet to be selected, when an aggregate of one or more confidence scores corresponding to one or more objects that e-Fe have been previously selected from the plurality of objects is less than a threshold value, wherein the movement of only the objects that are yet to be selected is changed in a predetermined way,
    wherein when the one or more objects are selected, the one or more objects become static.

19. The method of claim 18, wherein the server captures at least one of a thought process or subconscious choice of the user based on at least one of the set of factors.

* * * * *